(12) United States Patent
Yamato et al.

(10) Patent No.: US 9,035,582 B2
(45) Date of Patent: May 19, 2015

(54) MOTOR DRIVING APPARATUS AND MOTOR APPARATUS USING THE SAME

(75) Inventors: Tetsuo Yamato, Kyoto (JP); Takashi Fujimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 280 days.

(21) Appl. No.: 13/440,154

(22) Filed: Apr. 5, 2012

(65) Prior Publication Data

US 2012/0262097 A1     Oct. 18, 2012

(30) Foreign Application Priority Data

Apr. 5, 2011 (JP) ................................. 2011-083288

(51) Int. Cl.
| | |
|---|---|
| *H02P 6/16* | (2006.01) |
| *H02P 6/10* | (2006.01) |
| H02P 6/08 | (2006.01) |
| B62D 5/04 | (2006.01) |
| H02P 3/14 | (2006.01) |
| D06F 33/02 | (2006.01) |

(52) U.S. Cl.
CPC .. *H02P 6/08* (2013.01); *H02P 6/10* (2013.01); *H02P 6/16* (2013.01)

(58) Field of Classification Search
USPC ........................ 318/400.04–400.15, 721, 823
See application file for complete search history.

(56) References Cited

U.S. PATENT DOCUMENTS

| | | | |
|---|---|---|---|
| 2005/0184700 A1* | 8/2005 | Fujimura ...................... 318/807 |
| 2010/0219781 A1* | 9/2010 | Kuwamura .............. 318/400.04 |
| 2011/0234129 A1* | 9/2011 | Shimizu et al. .......... 318/400.04 |

FOREIGN PATENT DOCUMENTS

| | | | |
|---|---|---|---|
| JP | 2002084780 A | * | 3/2002 |
| JP | 2005-245094 | | 9/2005 |
| JP | 2005-278393 | | 10/2005 |

* cited by examiner

*Primary Examiner* — Bentsu Ro
*Assistant Examiner* — Said Bouziane
(74) *Attorney, Agent, or Firm* — Fish & Richardson P.C.

(57) ABSTRACT

A motor driving apparatus includes an automatic gain control circuit on a signal path for transmitting a rotor-position detecting signal (hall voltage signal), and the automatic gain control circuit includes: an amplifier, configured to perform differential amplification on an input signal (step-angle hall current signal) to generate an output signal (amplified hall current signal); and a feedback control portion, configured to monitor the output signal (monitored current signal) to decide a gain of the amplifier.

11 Claims, 18 Drawing Sheets

| Protection mode | AL(Alarm signal) | Pre-driver output (D*H) | Pre-driver output (D*L) | Charge pump output |
|---|---|---|---|---|
| Over voltage protection | High | Low | Low | Squelch |
| Under voltage protection | Low | Low | Low | Enabled |
| Over current protection | High | Low | Low | Enabled |
| Thermal shutdown | High | Low | Low | Enabled |
| Lock out protection | High | Low | Low | Enabled |

# MOTOR DRIVING APPARATUS AND MOTOR APPARATUS USING THE SAME

BACKGROUND OF THE INVENTION

1. Field of the Invention

The present invention relates to a motor driving apparatus performing driving control on a motor.

2. Description of the Related Art

A motor driving apparatus for controlling a phase angle of a motor driving signal according to a rotor-position detecting signal (such as a hall signal) is disclosed in the prior art (for example, referring to Patent Document 1 or Patent Document 2).

In particular, Patent Document 2 proposed by the applicant of the present application discloses a motor driving apparatus having an automatic gain control circuit on a signal path for transmitting a rotor-position detecting signal.

[Patent Document 1] Japanese Patent Publication No. 2005-245094
[Patent Document 2] Japanese Patent Publication No. 2005-278393

SUMMARY OF THE INVENTION

Problems to be Solved by the Invention

For the motor driving apparatus in Patent Document 2, the amplitude of a rotor-position detecting signal can be maintained at a fixed value through an automatic gain control circuit, thereby restraining uneven gains of a power driving section (output section) that generates a motor driving current.

The structure of the motor driving apparatus in Patent Document 2 can be described as follows. A total motor driving current that flows through the power driving section (a current obtained by adding all motor driving currents of multiple phases) is enabled to flow through a detection resistor to generate a negative feedback voltage, and automatic gain control on the rotor-position detecting signal is performed by making the negative feedback voltage consistent with a specific target voltage.

However, in the existing structure, power loss is generated due to the detection resistor, resulting in a problem of power efficiency decline of the motor driving apparatus. The power loss caused by the detection resistor can be reduced by setting the resistance of the detection resistor to a small value. However, when the resistance of the detection resistor becomes a small value, the Signal-to-Noise (S/N) of the negative voltage declines, resulting in other problems such as an undesirable circumstance of the automatic gain control of the rotor-position detecting signal. In a motor driving apparatus for driving control on a vehicle motor or a large household appliance motor (such as a compressor motor in an air conditioner or refrigerator), a very large motor driving current is required, making the problem especially serious.

In view of the problems found by the inventors of the present invention, the objective of the present invention is to provide a motor driving apparatus capable of performing automatic gain control on the rotor-position detecting signal without decreasing the power efficiency or S/N, as well as a motor apparatus using the motor driving apparatus.

Technical Means for Solving the Problems

In order to achieve the above objectives, a motor driving apparatus according to the present invention is provided as the following constitution (first constitution). The motor driving apparatus includes an automatic gain control circuit on a signal path for transmitting a rotor-position detecting signal, wherein the automatic gain control circuit includes: an amplifier, for amplifying an input signal to generate an output signal; and a feedback control portion, for monitoring the output signal to decide a gain of the amplifier.

The motor driving apparatus including the first constitution can be set to a second constitution, i.e. the automatic gain control circuit further includes: a monitoring signal generation portion, for generating a monitoring signal equivalent to the output signal; and a rectifier, for rectifying the monitoring signal to generate a rectified monitoring signal; wherein the feedback control portion monitors the rectified monitoring signal to decide the gain of the amplifier.

The motor driving apparatus including the second constitution can be set to a third constitution, i.e. the feedback control portion monitors an accumulated signal obtained by adding the rectified monitoring signals of multiple phases, to decide the gain of the amplifier.

The motor driving apparatus including the third constitution can be set to a fourth constitution, i.e. the feedback control portion decides the gain of the amplifier so as to enable the accumulated signal to become a specific signal level.

The motor driving apparatus including any of the first to fourth constitutions can be set to a fifth constitution, i.e. the motor driving apparatus further includes a phase adjustment circuit for performing phase adjustment on the rotor-position detecting signal.

The motor driving apparatus including the fifth constitution can be set to a sixth constitution, i.e. the phase adjustment circuit performs the phase adjustment on the rotor-position detecting signal of a first phase by adding the rotor-position detecting signal of a second phase and the rotor-position detecting signal of the first phase at a specific ratio.

The motor driving apparatus including the sixth constitution can be set to a seventh constitution, i.e. the ratio is variably controlled according to a control voltage.

The motor driving apparatus including any of the first to seventh constitutions can be set to an eighth constitution, i.e. the motor driving apparatus further includes: a pulse width modulation (PWM) signal generation circuit, for comparing the output signal of the automatic gain control circuit and a triangle wave signal at a specific frequency, to generate a PWM signal; and a driving circuit, for generating a motor driving signal according to the PWM signal.

The motor driving apparatus including the eighth constitution can be set to a ninth constitution, i.e. the motor driving apparatus further includes: an over current detection circuit, for detecting whether a motor driving current is in an over current state; and an over current protection circuit, for forcing the driving circuit to stop when the over current is detected.

The motor driving apparatus including the ninth constitution can be set to a tenth constitution, i.e. the over current protection circuit forces the driving circuit to suspend at least for a specific release period when the over current state of the motor driving current lasts a specific mute period.

The motor driving apparatus including the tenth constitution can be set to an eleventh constitution, i.e. the over current protection circuit includes: a first counter, for counting during the mute period; and a second counter, for counting during the release period.

A motor apparatus according to the present invention is provided as the following constitution (twelfth constitution). The motor apparatus includes: a motor; a rotor-position detecting component, for generating a rotor-position detecting signal; and the motor driving apparatus including any of the first to eleventh constitutions, for receiving input of the rotor-position detecting signal to perform driving control on the motor.

The motor apparatus including the twelfth constitution can be set to a thirteenth constitution, i.e. the rotor-position detecting component is a hall component.

Effect of the Invention

The present invention provides a motor driving apparatus capable of performing automatic gain control on a rotor-position detecting signal without decreasing power efficiency or noise immunity, and a motor apparatus using the motor driving apparatus.

DETAILED DESCRIPTION OF THE INVENTION

Block Diagram

Figure 1:
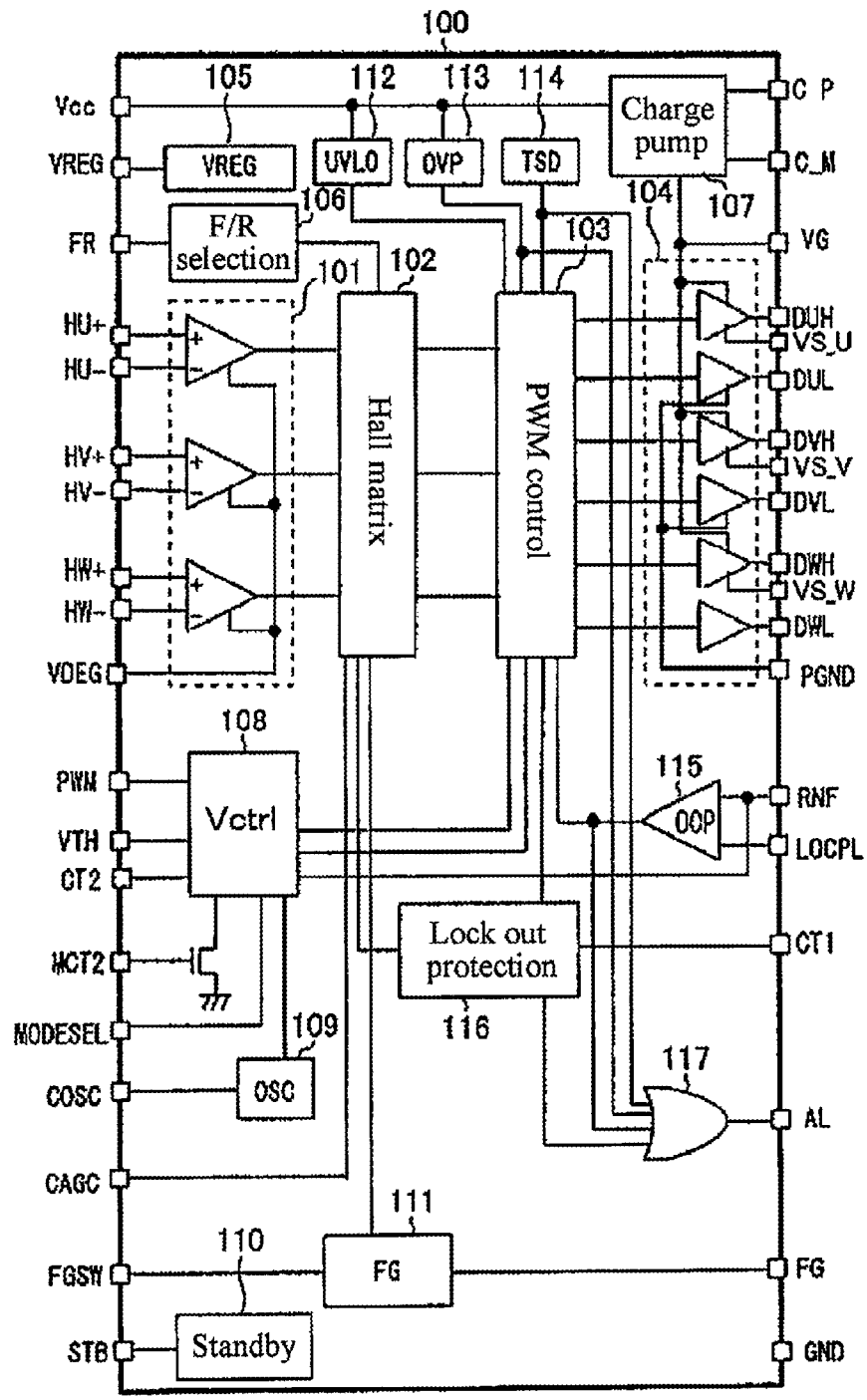
FIG. 1 is a block diagram of a structural example of a three-phase motor driver integrated circuit (IC)

FIG. 1 is a block diagram of a structural example of a three-phase motor driver IC. A three-phase motor driver IC 100 (referred to as the IC 100 hereinafter) in this structural example is a monolithic silicon semiconductor integrated circuit apparatus, including a hall amplifier 101, a hall matrix 102, a PWM controller 103, a pre-driver 104, a reference voltage generation portion 105, a forward rotation/reverse rotation selector 106, a charge pump 107, a torque control voltage generation portion 108, an oscillator 109, a standby control portion 110, a Frequency Generator (FG) signal generation portion 111, an under voltage lock out (UVLO) portion 112, an over voltage protection (OVP) portion 113, a thermal shutdown (TSD) portion 114, an over current protection (OCP) portion 115, a lock out protection portion 116 and an alarm signal output portion 117.

With respect to each phase, the hall amplifier 101 performs differential amplification on hall signals (HU+/HU−, HV+/HV−, HW+/HW−) input from a hall sensor of all motor phases (U phase/V phase/W phase), respectively, (referring to FIG. 2 or FIG. 3), and outputs the signals to the hall matrix 102. In addition, the hall amplifier 101 has a gain adjustment function corresponding to a step-angle control voltage VDEG.

The hall matrix 102 performs specific signal processing (offset adjustment processing or automatic gain control) on input signals from the hall amplifier 101, to generate a hall voltage Vhall (U/V/W) of each phase, and outputs the hall voltage Vhall to the PWM controller 103.

The PWM controller 103 generates pre-driver driving signals of all phases (a part have PWM driving, referring to FIG. 5 or FIG. 6) by maintaining a motor torque (alternatively referred to herein as motor rotational speed) at an expected target value according to the hall voltage Vhall (U/V/W) of each phase input from the hall matrix 102, a torque control voltage Vctrl input from the torque control voltage generation portion 108 and a triangle wave voltage Vosc input from the oscillator 109, and outputs the pre-driver driving signals to the pre-driver 104. In addition, the PWM controller 103 also has the following function: forcibly muting the pre-driver driving signal of each phase according to protection signals input from various protection circuit portions (the UVLO portion 112, OVP portion 113, TSD portion 114, OCP portion 115 and lock out protection portion 116).

Figure 2:
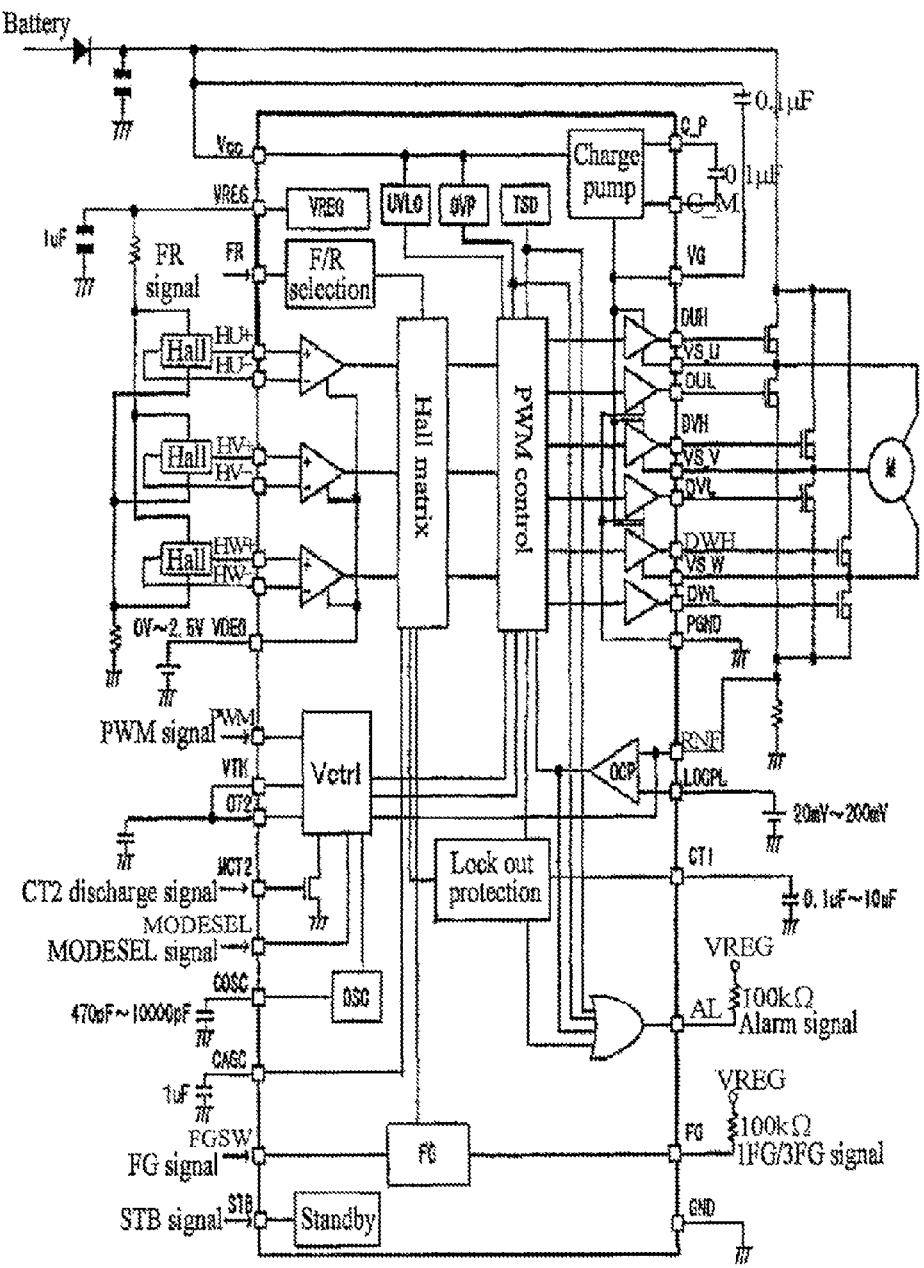
FIG. 2 is a block diagram of a first application circuit example (pulse width modulation (PWM) input)
Figure 3:
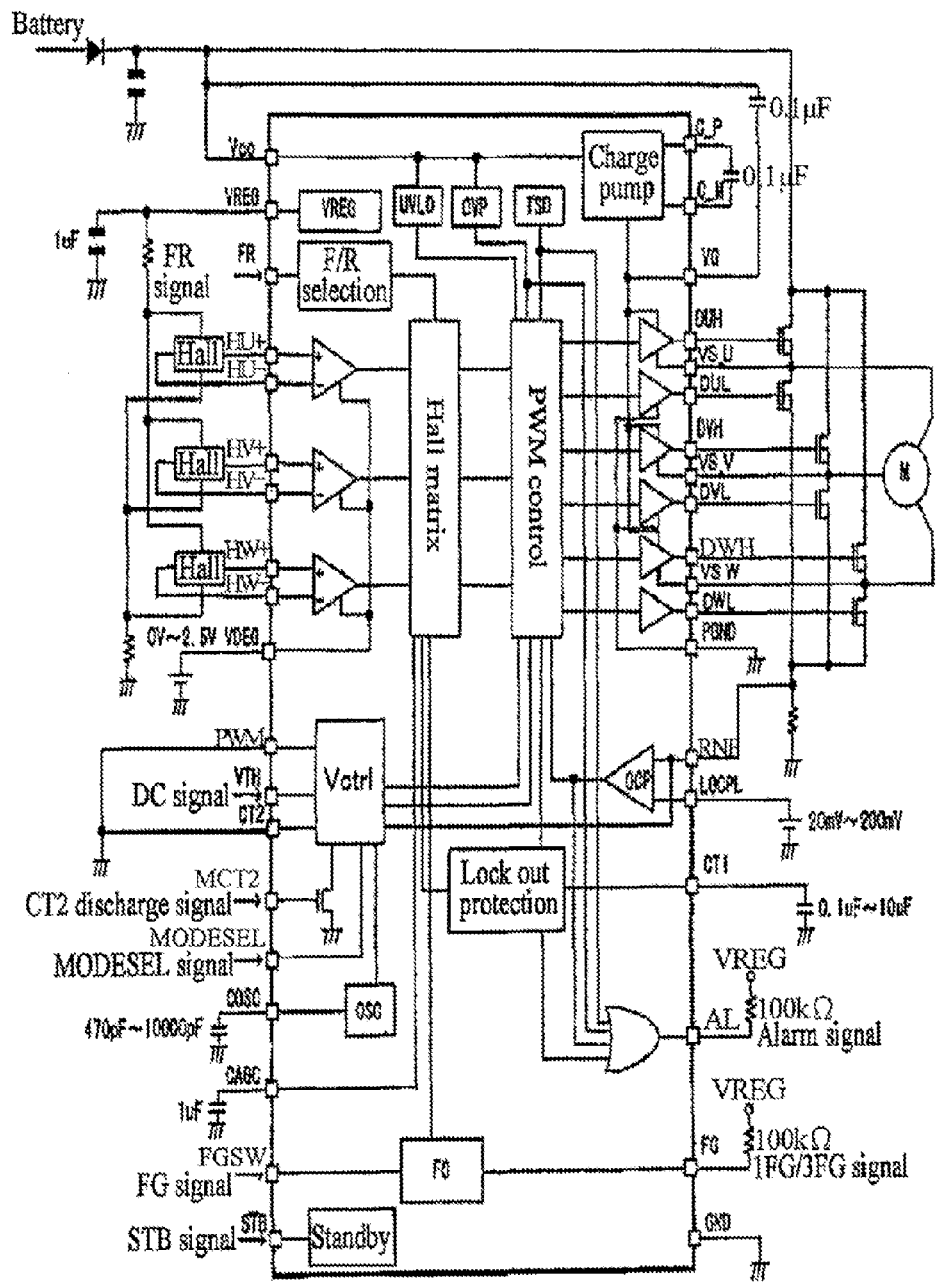
FIG. 3 is a block diagram of a second application circuit example (direct current (DC) input)

The pre-driver 104 performs specific signal processing (such as level shifting processing or waveform shaping processing) on the pre-driver driving signal of each phase input from the PWM controller 103, to generate driver driving signals of each phase (DUH/DUL, DVH/DVL, and DWH/DWL), and outputs the driver driving signals to an output section of an external power Metal Oxide Semiconductor (MOS) (referring to FIG. 2 or FIG. 3).

The reference voltage generation portion 105 generates an internal reference voltage VREG, and outputs the internal reference voltage VREG to a circuit block at each part of the IC.

Figure 5:
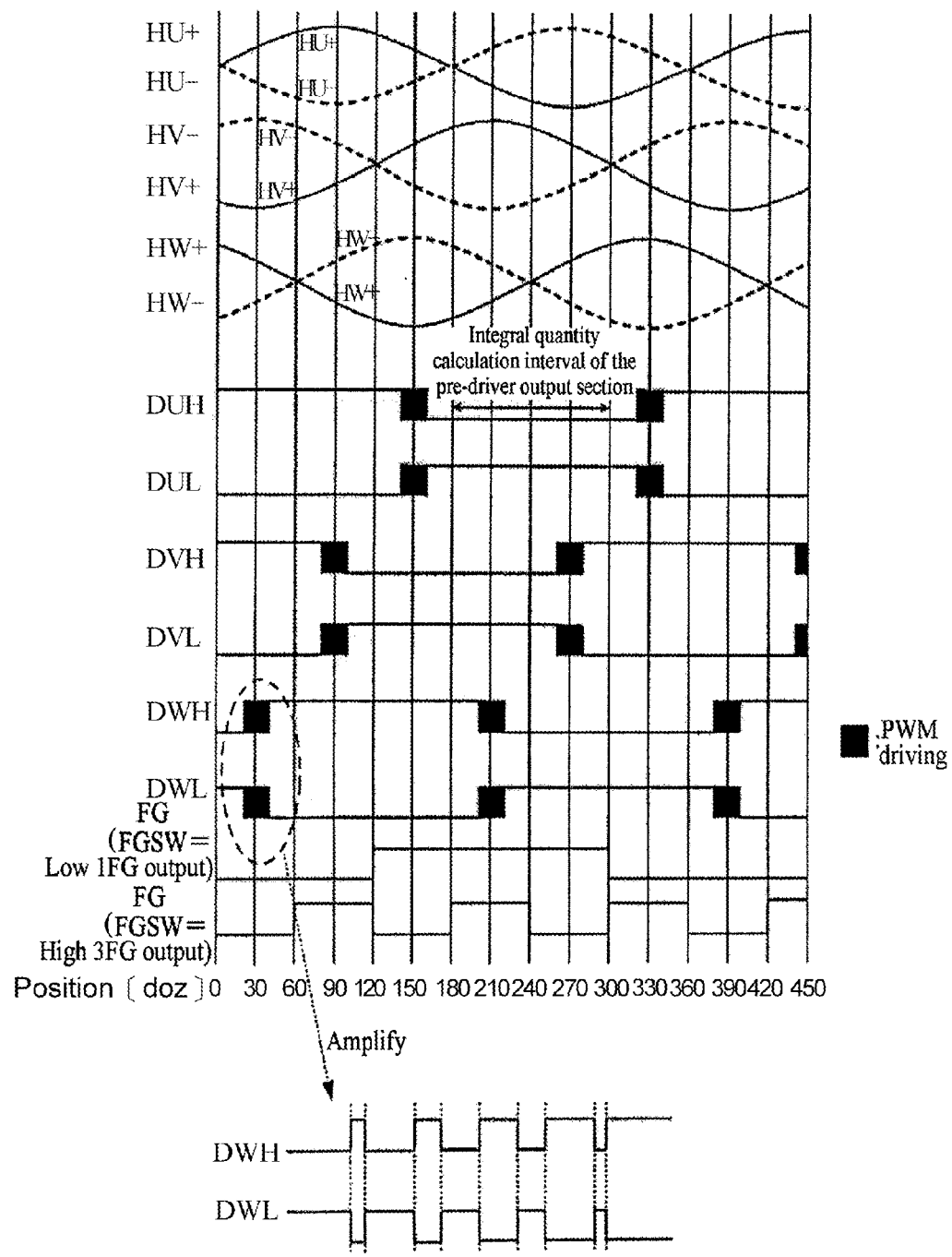
FIG. 5 is a time sequence diagram of reverse rotation.
Figures 6, 7:
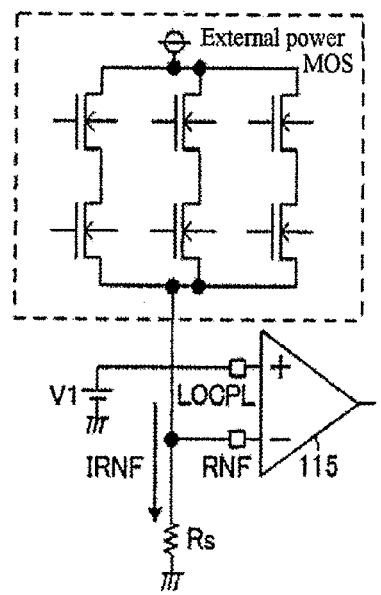
FIG. 6 is a table of output states at various fault protection actions.
FIG. 7 is an equivalent circuit diagram of an over current limiting portion.

The forward rotation/reverse rotation selector 106 sends an instruction to the hall matrix 102 by switching forward rotation/reverse rotation of the motor according to a forward rotation/reverse rotation switching signal FR input from outside the IC (referring to FIG. 5 and FIG. 6 in comparison).

The charge pump 107 generates a boost voltage VG (power source voltage of the pre-driver) according to a power source voltage VCC, and outputs the boost voltage VG to the pre-driver 104.

The torque control voltage generation portion 108 generates a torque control voltage Vctrl (DC voltage signal) corresponding to the torque instruction (alternatively referred to herein as rotational speed instruction) input from outside the IC, and outputs the torque control voltage Vctrl to the PWM controller 103. In addition, the torque control voltage generation portion 108 can receive input of either an analog voltage VTH or a PWM signal PWM as the torque instruction. Moreover, the torque control voltage generation portion 108 further has an output mode selection function corresponding to a mode switching signal MODESEL input from outside the IC, which is described in detail below.

The oscillator 109 generates a triangle wave voltage Vosc with a specific frequency which is output to the PWM controller 103 via the torque control voltage generation portion 108. In addition, an oscillation frequency fosc of the triangle wave voltage Vosc is decided based on the formula (1) and according to a capacitance value C of an external capacitor of a COSC terminal and a current value of an IC internal current (for example, 25 µA). Further, the capacitance value C of the capacitor is desirably set within the range of 470 pF to 10000 pF.

$$f\text{osc [kHz]}=1/(C/25\ [\mu A]) \quad (1)$$

The standby control portion 110 switches a standby state (ready state) and an enabled state (active state) according to a standby signal STB input from outside the IC.

The FG signal generation portion 111 generates an FG signal corresponding to a motor rotational speed. In addition, the FG signal generation portion 111 has a function of switching a pulse period of the FG signal according to a 1FG/3FG switching signal FGSW input from outside the IC (referring to FIG. 5 or FIG. 6). Moreover, if noise is superposed on the hall signal, the FG signal can suffer from a chattering problem. Particularly, when the motor suddenly changes from forward rotation to reverse rotation or from reverse rotation to forward rotation, the power source voltage fluctuates, resulting in noise superposition in the hall signal, thereby increasing the possibility of chattering of the FG signal. In order to reduce noise in the hall signal, a capacitor can be inserted between hall input terminals to increase an input level of the hall signal.

The UVLO portion 112 monitors the power source voltage VCC to generate an under voltage protection signal, and outputs the under voltage protection signal to the PWM controller 103. When the power source voltage VCC is below an under voltage detection value, the under voltage protection signal becomes a fault logic level (for example, a high level), and the PWM controller 103 that receives the signal sets the output to an open circuit (namely, setting the total output of the pre-driver to a low level).

The OVP portion 113 monitors the power source voltage VCC to generate an OVP signal, and outputs the OVP signal to the PWM controller 103 and the alarm signal output portion 117. When the power source voltage VCC is above an over voltage detection value (for example, 30 V (typ.)), the OVP signal becomes a fault logic level (for example, a high level), and the PWM controller 103 that receives the signal sets the output to an open circuit (namely, setting the total output of the pre-driver to a low level). In addition, the OVP portion 113 only acts when the IC 100 is enabled (STB=Hi), and does not act in a standby period (STB=Low) when the IC internal current supply is stopped.

The TSD portion 114 monitors the chip temperature of the IC 100 to generate a temperature protection signal, and outputs the temperature protection signal to the PWM controller 103 and the alarm signal output portion 117. When the chip temperature of the IC 100 is above 175° C., the temperature protection signal becomes a fault logic level (for example, a high level), and the PWM controller 103 that receives the signal sets the output to an open circuit (namely, setting the total output of the pre-driver to a low level). In another aspect, when the chip temperature of the IC 100 is below 150° C., the temperature protection signal becomes a normal logic level (for example, a low level), and the PWM controller 103 that receives the signal returns to a normal action.

The OCP portion 115 monitors a torque output voltage VRNF corresponding to a motor driving current flowing through a power MOS section (driver section) outside the IC, to generate an OCP signal, and outputs the OCP signal to the PWM controller 103 and the alarm signal output portion 117. When the torque output voltage VRNF is above an over current detection value, the OCP signal becomes a fault logic level (for example, a high level), and the PWM controller 103 that receives the signal sets the output to an open circuit (namely, setting the total output of the pre-driver to a low level).

The lock out protection portion 116 monitors input signals from the hall amplifier 101, to generate a lock out protection signal, and outputs the lock out protection signal to the PWM controller 103 and the alarm signal output portion 117. If the input logic level from the hall amplifier 101 is not switched during an entire specific time, the lock out protection signal becomes a fault logic level (for example, a high level), and the PWM controller 103 that receives the signal sets the output to an open circuit (namely, setting the total output of the pre-driver to a low level).

The alarm signal output portion 117 generates an alarm signal AL according to the OVP signal, the temperature protection signal, the OCP signal and the lock out signal, and outputs the alarm signal AL to the outside of the IC. In the example of FIG. 1, a logical "or" arithmetical unit is used as the alarm signal output portion 117. Therefore, as long as any one of the OVP signal, the temperature protection signal, the OCP signal and the lock out signal is at a high level, the alarm signal AL turns to the high level. When all the protection signals are at a low level, the alarm signal AL turns to a low level.

<Application Circuit Example>

FIG. 2 and FIG. 3 are block diagrams of a first application circuit example and a second application circuit example using the IC 100, respectively. In addition, in FIG. 2, a structure in which a PWM signal PWM is input as a torque instruction delivered to the torque control voltage 108 is depicted. In FIG. 3, a structure in which an analog voltage VTH is input as the torque instruction delivered to the torque control voltage 108 is depicted.

In addition, when the PWM signal PWM is input to a PWM terminal as the torque instruction delivered to the torque control voltage generation portion 108, as shown in FIG. 2, a capacitor is connected between a CT2 terminal and a ground end, and the CT2 terminal and the VTH terminal are short circuit. Through such a connection, a smooth voltage of the PWM signal PWM generated inside the torque control voltage generation portion 108 is applied to the VTH terminal via the CT2 terminal, and the smooth voltage is used as a torque control voltage Vctrl and is output to the PWM controller 103.

In another aspect, when the analog voltage VTH is input to the VTH terminal as the torque instruction delivered to the torque control voltage generation portion 108, as shown in FIG. 3, the PWM terminal and the CT2 terminal are both connected to the ground end. Through such a connection, the analog voltage VTH input to the VTH terminal is directly used as the torque control voltage Vctrl and is output to the PWM controller 103.

In addition, when a start delay is set, an external resistance-capacity filter (R-C filter) is set. Moreover, even if either the PWM signal PWM or the analog voltage VTH is input as the torque instruction delivered to the torque control voltage generation portion 108, an MCT2 terminal can be used to enable the capacitor connected to the CT2 terminal to discharge.

<External Terminal>

The IC 100 includes 40 external terminals that serve as a mechanism for establishing an electrical connection to the exterior.

Pin 1 (GND) is a ground terminal. Pin 2 (FG) is a 1FG/3FG output terminal Pin 3 (AL) is an alarm signal output terminal Pin 4 (LOCPL) is a current limitation setting terminal Pin 5 (RNF) is a current detection terminal Pin 6 (N.C.) is a non-connection terminal Pin 7 (DWL) is an L-side FET driving output terminal of a W phase. Pin 8 (VS_W) is an output terminal of a W phase. Pin 9 (DWH) is an H-side FET driving output terminal of a W phase. Pin 10 (DVL) is an L-side FET driving output terminal of a V phase.

Pin 11 (VS_V) is an output terminal of a V phase. Pin 12 (DVH) is an H-side FET driving output terminal of a V phase. Pin 13 (PGND) is a ground terminal of a power system circuit. Pin 14 (DUL) is an L-side FET driving output terminal of a U phase. Pin 15 (VS_U) is an output terminal of a U phase. Pin 16 (DUH) is an H-side FET driving output terminal of a U phase. Pin 17 (C_M) is a charge pump capacitor connection terminal (− side). Pin 18 (C_P) is a charge pump capacitor connection terminal (+ side). Pin 19 (VG) is a power source terminal of the pre-driver. Pin 20 (VCC) is a power source terminal.

Pin 21 (TEST) is a TEST terminal, and is fixed at a low level in normal use. Pin 22 (MODESEL) is an output mode selection terminal Pin 23 (FR) is a forward rotation/reverse rotation switching terminal Pin 24 (FGSW) is a 1FG/3FG switching terminal Pin 25 (STB) is a standby terminal. Pin 26 (VREG) is an internal reference power source terminal Pin 27 (HU+) is a U-phase hall input terminal (+ side). Pin 28 (HU−) is a U-phase hall input terminal (− side). Pin 29 (HV+) is a V-phase hall input terminal (+ side). Pin 30 (HV−) is a V-phase hall input terminal (− side).

Pin 31 (HW+) is a W-phase hall input terminal (+ side). Pin 32 (HW−) is a W-phase hall input terminal (− side). PIN 33 (VTH) is a speed control input terminal (DC). Pin 34 (CT2) is a start time setting terminal PIN 35 (PWM) is a speed control input terminal (PWM). Pin 36 (CT1) is a lock out protection time setting terminal. Pin 37 (CAGC) is a capacitor connection terminal for phase compensation. Pin 38 (VDEG) is a terminal for step-angle control. Pin 39 (MCT2) is a terminal for discharge of the capacitor connected to CT2. Pin 40 (COSC) is a PWM frequency setting terminal.

<Time Sequence Diagram>

Figure 4:
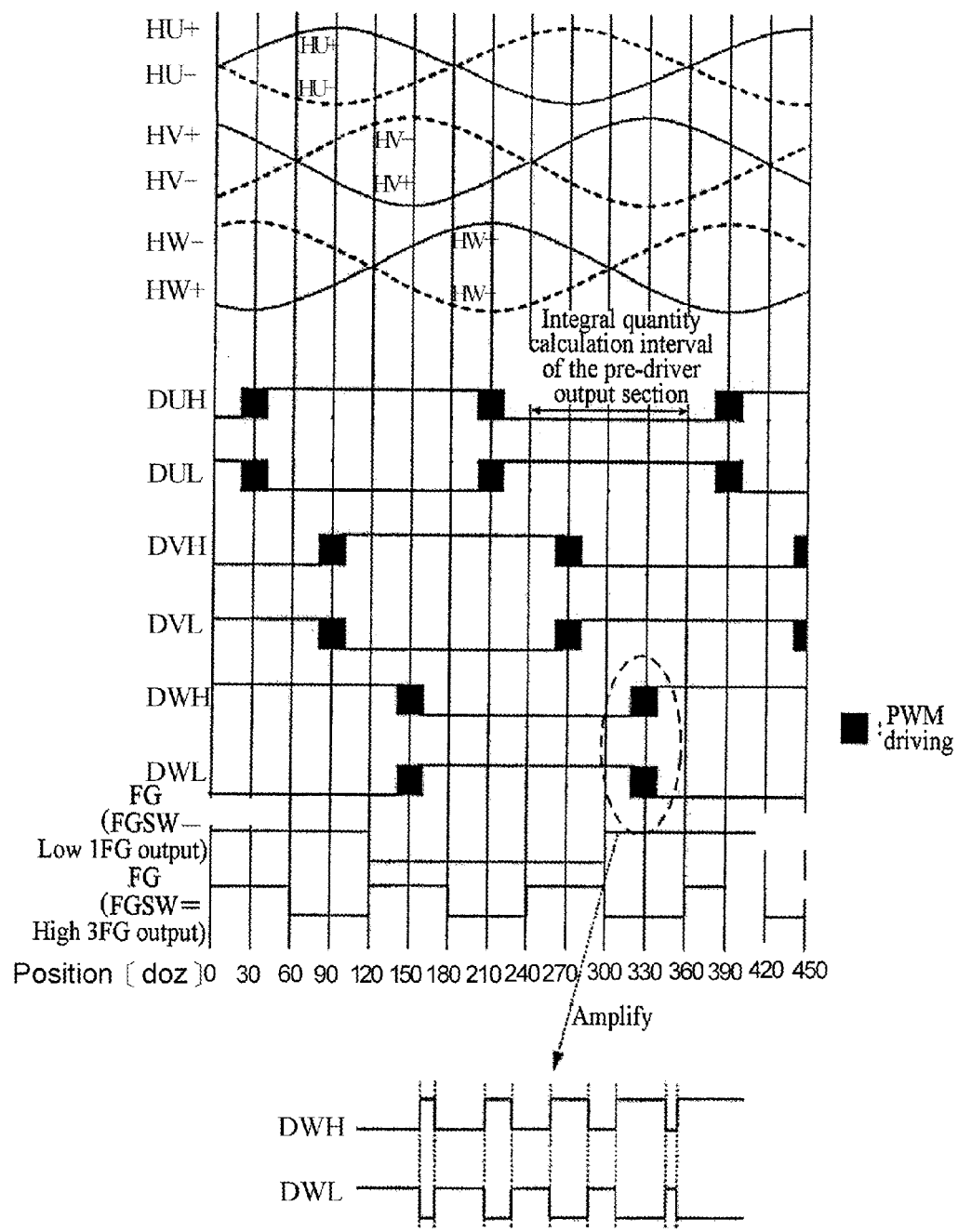
FIG. 4 is a time sequence diagram of forward rotation.

FIG. 4 and FIG. 5 are both time sequence diagrams illustrating an action of the IC 100, and the hall signals of all phases (HU+/HU−, HV+/HV−, HW+/HW−), driver driving signals of all phases (DUH/DUL, DVH/DVL, DWH/DWL) and FG signals (1FG output (FGSW=L)/3FG output (FGSW=H)) are shown from top to bottom in sequence. In addition, FIG. 4 is a diagram depicting a situation in which the motor rotates forward (FR=L), and FIG. 5 is a diagram depicting a situation in which the motor rotates reversely (FR=H).

<Fault Protection Action>

FIG. 6 is a table of output states at various fault protection actions. As described above, if any one of the OVP, under voltage protection, OCP, TSD and lock out protection is applied, all pre-driver output (D*H/D*L, where *=U, V, W) turns to a low level, and the output turns to an open circuit. In addition, for the alarm signal AL, if any one of the OVP, OCP, TSD and lock out protection is applied, the alarm signal AL turns to the fault logic level (a high level herein). In another aspect, even if the under voltage protection is applied, the alarm signal AL is still maintained at the normal logic level (a low level herein). Moreover, mute is performed on the charge pump output only when the OVP is applied, and even if other protections (under voltage protection, OCP, STD and lock out protection) are applied, the charge pump output is still maintained at the enabled state.

<Current Limiting Function (OCP Function)>

FIG. 7 is an equivalent circuit diagram of an over current limiting portion. A current limiting current I for determining whether the motor driving current IRNF (a current obtained by adding motor driving currents of all phases) is in an over current state is decided according to an analog voltage V1 applied to the LOCPL terminal and the resistance value Rs of the inductive resistor connected to the RNF terminal and based on the following formula (2). In addition, the analog voltage V1 is desirably set within the range of 20 mV to 200 mV.

$$I = V1/Rs \quad (2)$$

<Lock Out Protection Function>

The lock out protection portion 116 detects a lock out state of the motor under the circumstance that the input logic level received from the hall amplifier 101 is not switched during an entire specific lock out protection on time TON1, and outputs a lock out protection signal to the PWM controller 103 by setting the total output of the pre-driver to a low level.

The lock out protection on time TON1 is calculated according to the following formula (3). Further, for the variables in the following formula (3), C is a capacity value of an external capacitor of the CT1 terminal, ILOCK2 is a source current (for example, 1 μA) for lock out protection detection, VLOCKP_H is a comparison H voltage (for example, 3.85 V) for comparison reference of the CT1 terminal voltage, and VLOCKP_L is a comparison L voltage (for example, 0.55 V) as a reference for the comparison with the CT1 terminal voltage. For example, when C=1 μF, TON1=3.3 s; and when C=10 μF, TON1=33 s. In addition, the capacity value C is desirably set within the range of 0.1 μF to 10 μF. Moreover, if the lock out protection on time TON1 is not set, a short circuit is established between the CT1 terminal and the ground.

$$TON1 = (VLOCKP\_H - VLOCKP\_L)/(ILOCK2/C) \quad (3)$$

Figure 8:
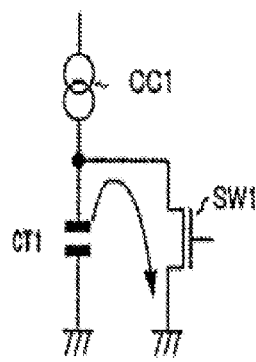
FIG. 8 is an equivalent circuit diagram of a charge discharge portion of a CT1 terminal.
Figure 11:
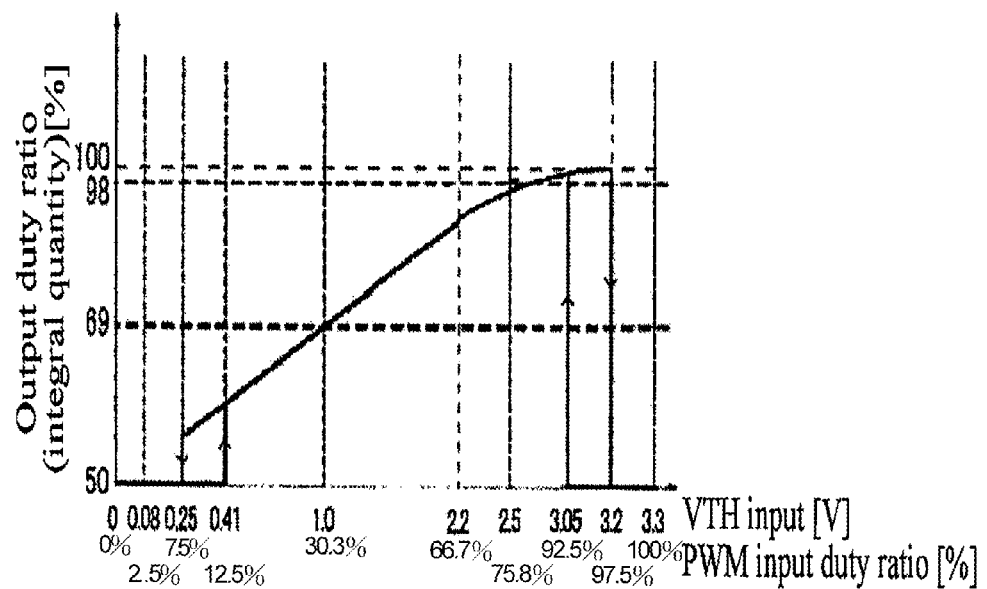
FIG. 11 is a correlation diagram of a torque instruction and an output duty ratio (when a first output mode is selected)
Figure 12:
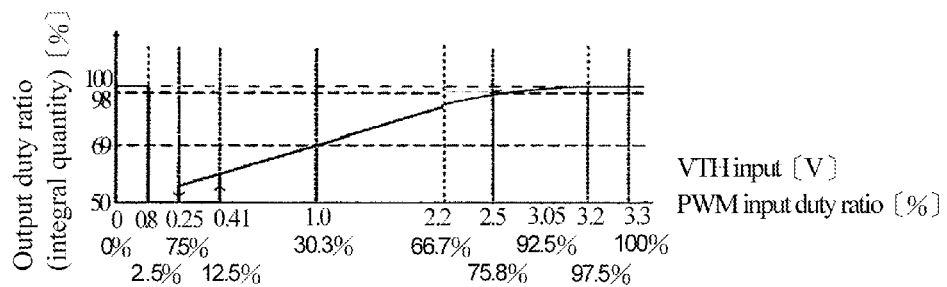
FIG. 12 is a correlation diagram of a torque instruction and an output duty ratio (when a second output mode is selected)

FIG. 8 is an equivalent circuit diagram of a charge discharge portion of a CT1 terminal. When the lock out protection is released for a restart, the discharge of charges of the capacitor connected to the CT1 terminal should be performed thoroughly. When an output duty ratio (integral quantity) in FIG. 11 and FIG. 12 is 50%, a discharge switch SW1 in FIG. 8 is switched on for the discharge of charges of the capacitor connected to the CT1 terminal.

<Start Time•Deceleration Time (Braking)>

Figure 9:
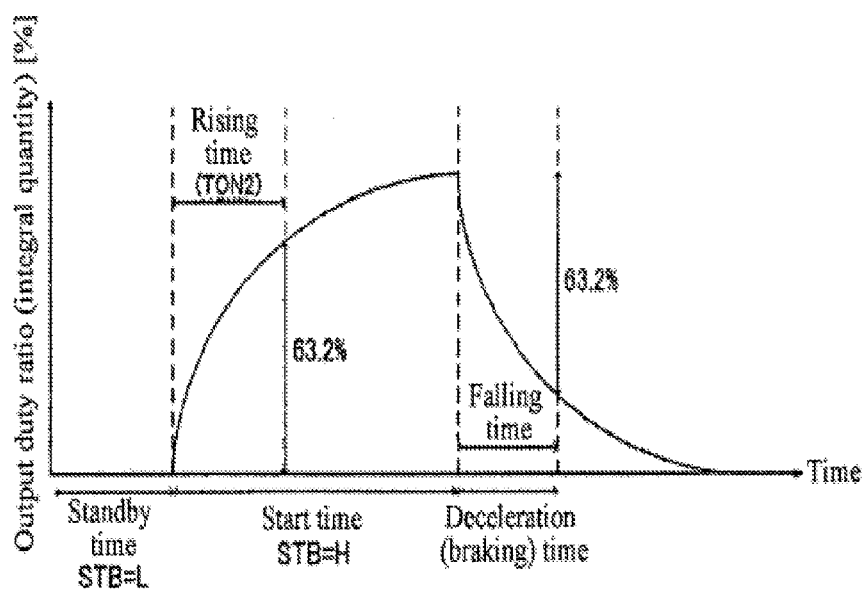
FIG. 9 is a time sequence diagram of a start time and a deceleration time of output.

FIG. 9 is a time sequence diagram of a start (restoration) time and a deceleration (braking) time of output. In addition, an ordinate axis in FIG. 9 denotes the integral quantity of the output duty ratio (integral quantity within the 120° interval in FIG. 4 and FIG. 5), and an abscissa axis denotes the time. When it is shifted from a standby state (STB=Low) to an enabled state (STB=Hi), the rise of the output can be maintained for a specific start time. In addition, the deceleration (braking) time has the same value as the start time.

The start time and deceleration time of the output are decided by a rising time (or a falling time) TON2 calculated based on the following formula (4). As for the variables in the following formula (4), C is a capacity value C of an external capacitor of the CT2 terminal, and R is a resistance value (for example, 200 kΩ) of an internal resistor of the IC. For example, when C=1 μF, TON2=0.2 s; and when C=10 μF, TON2=2 s. In this way, the start time and deceleration time of the output can be adjusted arbitrarily according to the capacity value C of the external capacitor of the CT2 terminal $$TON2=C \times R \quad (4)$$

In addition, the capacitor connected to the CT2 terminal also has a function of smoothing the PWM signal PWM input to the PWM terminal. The fluctuation accuracy of a smooth voltage presented at the CT2 terminal affects the output duty ratio accuracy. Therefore, when the rising time TON2 is set, it is desirable that a change of the duty ratio is determined while optimally setting the capacity value of the capacitor connected to the CT2 terminal. It is particularly desirable that the capacity value of the capacitor connected to the CT2 terminal is set so that a cutoff frequency fc (fc=$\frac{1}{2\pi CR}$) is below $\frac{1}{10}$ of an oscillation frequency of the PWM signal PWM.

In addition, when the discharge of the capacitor connected to the CT2 terminal is performed, the duty ratio of the PWM signal PWM input to the PWM terminal can be fixed at 0%, and the discharge is performed through the resistor of 200 kΩ. Alternatively, the discharge is performed by switching on the discharge switch connected to the MCT2 terminal (the maximum value of the on-state resistance is 500Ω).

<Torque Instruction>

Figure 10:
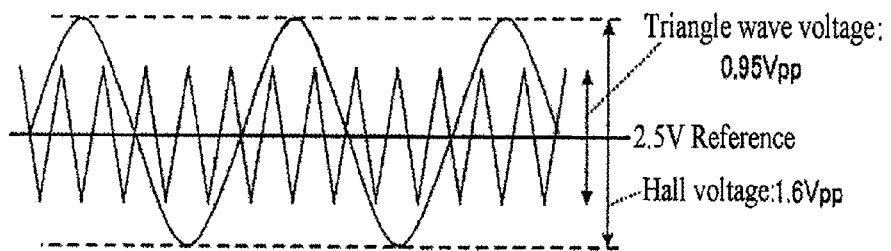
FIG. 10 is a waveform diagram of a triangle wave voltage Vosc and a hall voltage Vhall.

FIG. 10 is a waveform diagram of a triangle wave voltage Vosc and a hall voltage Vhall. In the PWM controller 103, the triangle wave voltage Vosc having a fixed amplitude Vx (for example, Vx=0.95 Vpp) and the hall voltage Vhall having a variable amplitude Vy corresponding to a torque control voltage VTH (for example, when VTH=2.5 V, Vy=1.66 Vpp) are compared with 2.5 V, which serves as a reference, to perform PWM driving control on the pre-driver driving signal of each phase, so that the motor torque is maintained at an expected target value.

That is, in the IC 100, by adjusting the input duty ratio of the PWM signal PWM input from outside the IC (or the voltage value of the analog voltage VTH), the voltage value of the torque control voltage VTH is changed, thereby performing variable control on the torque output voltage VRNF.

In addition, a specific hysteresis is set for a change behavior of the output duty ratio (integral quantity) relative to the input duty ratio of the PWM signal PWM (or the voltage value of the analog voltage VTH). Specifically, for a lower side hysteresis, as shown in FIG. 11 or FIG. 12, whatever the output mode is, a PWM input duty ratio of 12.5% (VTH input 0.41 V) is set as the rising threshold, and the PWM duty ratio of 7.5% (VTH input 0.25 V) is set as the falling threshold. In another aspect, for an upper side hysteresis, as shown in FIG. 11, when a first output mode is selected, a PWM input duty ratio of 97.5% (VTH input 3.2 V) is set as the falling threshold, and a PWM duty ratio of 92.5% (VTH input 3.05 V) is set as the rising threshold. In another aspect, as shown in FIG. 12, when a second output mode is selected, even if the PWM input duty ratio (VTH input) is increased to 100%, the output duty ratio (integral quantity) does not decline to 50%. Therefore, the upper side hysteresis is not set.

<Output Mode Selection Function>

FIG. 11 and FIG. 12 are correlation diagrams of a torque instruction (PWM input duty ratio [%]/VTH voltage [V]) and an output duty ratio (integral quantity). FIG. 11 denotes a behavior when the first output mode is selected (MODESEL=L), and FIG. 12 denotes a behavior when the second output mode is selected (MODESEL=H). In addition, in FIG. 11 and FIG. 12, a structure in which a greater torque instruction basically results in a higher output duty ratio (integral quantity) is taken as an example for the following description, but the structure of the present invention is not limited thereto. On the contrary, a structure in which a greater torque basically results in a lower output duty ratio (integral value) can be adopted.

In the IC 100, either the first output mode or the second output mode can be selected arbitrarily according to a MODESEL terminal voltage. However, it is undesirable to switch the selected state of the output mode during the action.

The difference between the first output mode and the second output mode is described in detail. When the first output mode is selected, as shown in FIG. 11, no matter when the PWM input duty ratio is 0% (VTH voltage 0 V) or when the PWM input duty ratio is 100% (VTH voltage 3.3 V), the output duty ratio (integral quantity) declines to 50%, and the total output of the pre-driver 40 is forced to become the low level. Therefore, no matter the PWM terminal or VTH terminal has a power source short circuit (short circuited at the power source end or a similar high level end) or has a ground fault (short circuited at the ground end or a similar low level end), the motor is stopped.

In another aspect, when the second output mode is selected, as shown in FIG. 12, even in the case where the PWM input duty ratio is 0% (VTH voltage 0 V) or 100% (VTH voltage 3.3 V), the output duty ratio (integral quantity) rises to the maximum degree. Therefore, even when the PWM terminal or VTH terminal has a power source short circuit/ground fault, the motor runs at full speed.

By setting the structure to have such an output mode selection function, when a fault occurs on the PWM terminal or VTH terminal, regardless of the particular nature of the fault, the motor can maintain the state intended by the user (a suspended state or a full-speed running state).

For example, in a blower motor for air circulation in a vehicle, in order to prevent the temperature of the motor from rising, when a fault occurs on the torque instruction input terminal (the PWM terminal or VTH terminal), regardless of the particular nature of the fault, the blower motor is required to be stopped. Therefore, if the IC 100 is used as a driving mechanism of such a blower motor, the first output mode (MODESEL=L) is selected beforehand.

In another aspect, in a cooling fan motor carried in a vehicle for cooling a fuel battery, in order to prevent the temperature of the fuel battery from rising, when a fault occurs on the torque instruction input terminal (the PWM terminal or VTH terminal), regardless of the particular nature of the fault, the cooling fan motor is required to run at full speed. Therefore, if the IC 100 is used as a driving mechanism of such a cooling fan motor, the second output mode (MODESEL=H) is selected beforehand.

In this manner, in the IC 100, the action state of the motor can be selected arbitrarily when a fault occurs in the torque instruction input terminal (the PWM terminal or VTH terminal), thereby improving the safety of the component.

In addition, as only either the first output mode or the second output mode is selected, a dedicated motor driver IC for driving control of a motor for a specific use (for example, a dedicated motor driver IC for a blower motor or a dedicated motor driver IC for a cooling fan motor) can also be provided. In the IC 100, as long as the structure in which the first output mode and the second output mode can be switched arbitrarily according to the mode selection signal MODESEL is adopted, the use of the motor is not limited. Therefore, the versatility of the IC is improved, thereby contributing to its usability and reducing associated costs.

<Motor Driving Apparatus>

Figure 13:
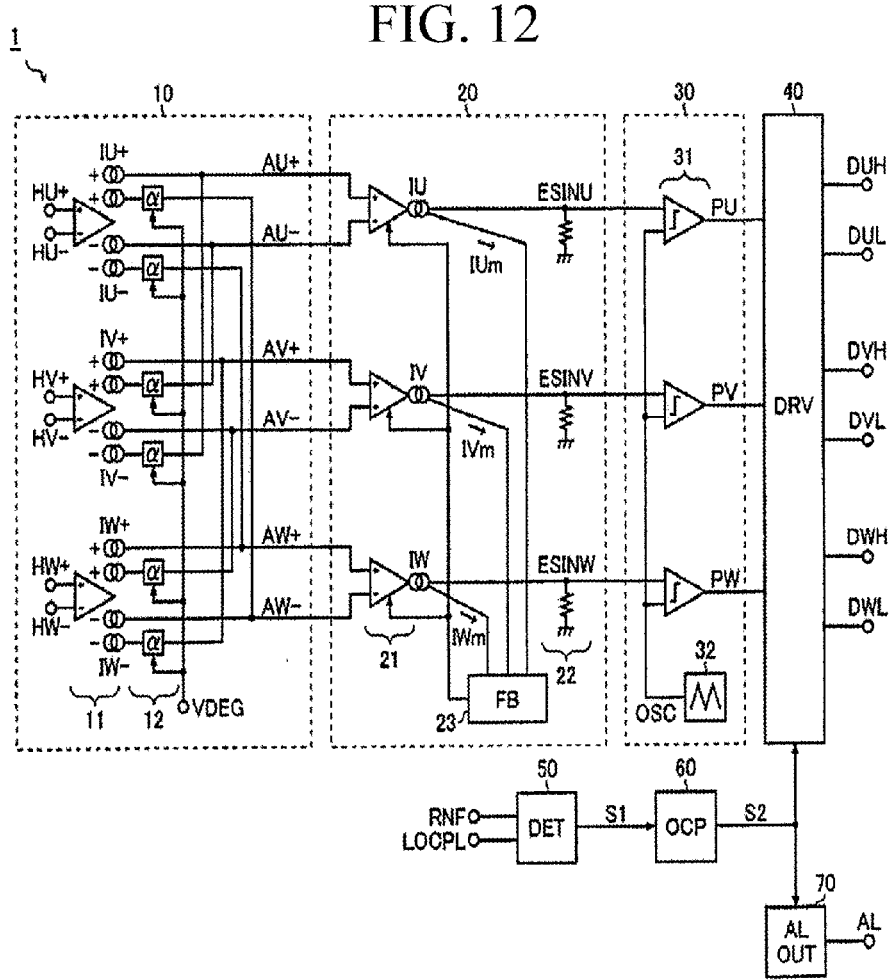
FIG. 13 is a diagram of a motor driving apparatus (a structure of a major part) according to an embodiment.

FIG. 13 is a diagram of a motor driving apparatus (structure of a major part) according to an embodiment. A motor driving apparatus 1 in this embodiment includes a phase adjustment circuit 10, an automatic gain control circuit 20, a PWM signal generation circuit 30, a pre-driving circuit 40, an over current detection circuit 50, an OCP circuit 60, and an alarm signal output circuit 70. The motor driving apparatus 1 in this embodiment is equivalent to the motor driver IC 100 in FIG. 1. Therefore, the detailed description is provided below with proper references to FIG. 1 to FIG. 3.

The phase adjustment circuit 10 is equivalent to the hall amplifier 101 in FIG. 1. The phase adjustment circuit 10 performs phase adjustment (step-angle control) on a hall voltage signal H*(+/−) (* is any one of U/V/W) according to a step-angle control voltage VDEG. The phase adjustment circuit 10 includes a hall amplifier 11 and an operation portion 12. The hall amplifier 11 generates a hall current signal I*(+/−) corresponding to the hall voltage signal H*(+/−). The operation portion 12 performs specific operation processing on the hall current signal I*(+/−) to generate a step-angle hall current signal A*(+/−). The structure and action of the phase adjustment circuit 10 are described in detail later in this document.

The automatic gain control circuit 20 is equivalent to the hall matrix 102 in FIG. 1. The automatic gain control circuit 20 receives input of the step-angle hall current signal A*(+/−) to generate a sine wave voltage signal E SIN* with a fixed amplitude. The automatic gain control circuit 20 includes a difference amplifier 21, a current/voltage conversion portion 22, and a feedback control portion 23. The difference amplifier 21 performs differential amplification on the step-angle current signal A*(+/−) of each phase to generate an amplified hall current signal I*. The current/voltage conversion portion 22 enables the amplified hall current signal I* to flow through a resistor to generate a sine wave voltage signal E SIN*. The feedback control portion 23 monitors the amplified hall current signal I* (more precisely, equivalently monitoring a current signal I*m) to decide a gain of the difference amplifier 21. The structure and action of the automatic gain control circuit 20 are described in detail later in this document.

The PWM signal generation circuit 30 is equivalent to the PWM controller 103 in FIG. 1. The PWM signal generation circuit 30 compares the sine wave voltage signal E SIN* and a triangle wave signal OSC of a specific frequency, to generate a PWM signal P*. The PWM signal generation circuit 30 includes a comparator 31 and the oscillator 32. The comparator 31 compares the sine wave voltage signal E SIN* and the triangle wave signal OSC, to generate the PWM signal P*. The comparator 31 is granted a hysteresis feature. The oscillator 32 generates the triangle wave signal OSC at a specific frequency.

The pre-driving circuit 40 is equivalent to the pre-driver 104 in FIG. 1. The pre-driving circuit 40 generates a motor driving signal D*(H/L) according to the PWM signal P*.

The over current detection circuit 50 is equivalent to the OCP portion 115 in FIG. 1. The over current detection circuit 50 compares an RNF terminal voltage (equivalent to the motor driving current flowing through the power driving section) and an LOCPL terminal voltage (equivalent to the threshold voltage for over current detection), to generate an over current detecting signal S1. The over current detecting signal S1 becomes a fault logic level (for example, a high level) when the RNF terminal voltage is higher than the LOCPL terminal voltage, and becomes a normal logic level (for example, a low level) when the RNF terminal voltage is lower than the LOCPL terminal voltage.

The OCP circuit 60 is equivalent to the OCP portion 115 in FIG. 1. The OCP protection circuit 60 receives input of the over current detecting signal S1 to generate an OCP signal S2, and outputs the OCP signal S2 to the pre-driving circuit 40 (or the PWM signal generation circuit 30). When the OCP signal S2 becomes the fault logic level (for example, a high level), the pre-driving circuit 40 is forced to stop. In addition, the structure and action of the OCP circuit 60 are described in detail later in this document.

The alarm signal output circuit 70 is equivalent to the alarm signal output portion 117 in FIG. 1. The alarm signal output circuit 70 outputs an alarm signal AL corresponding to the OCP signal S2 from an AL terminal to the outside.

<Phase Adjustment Circuit>

Figure 14:
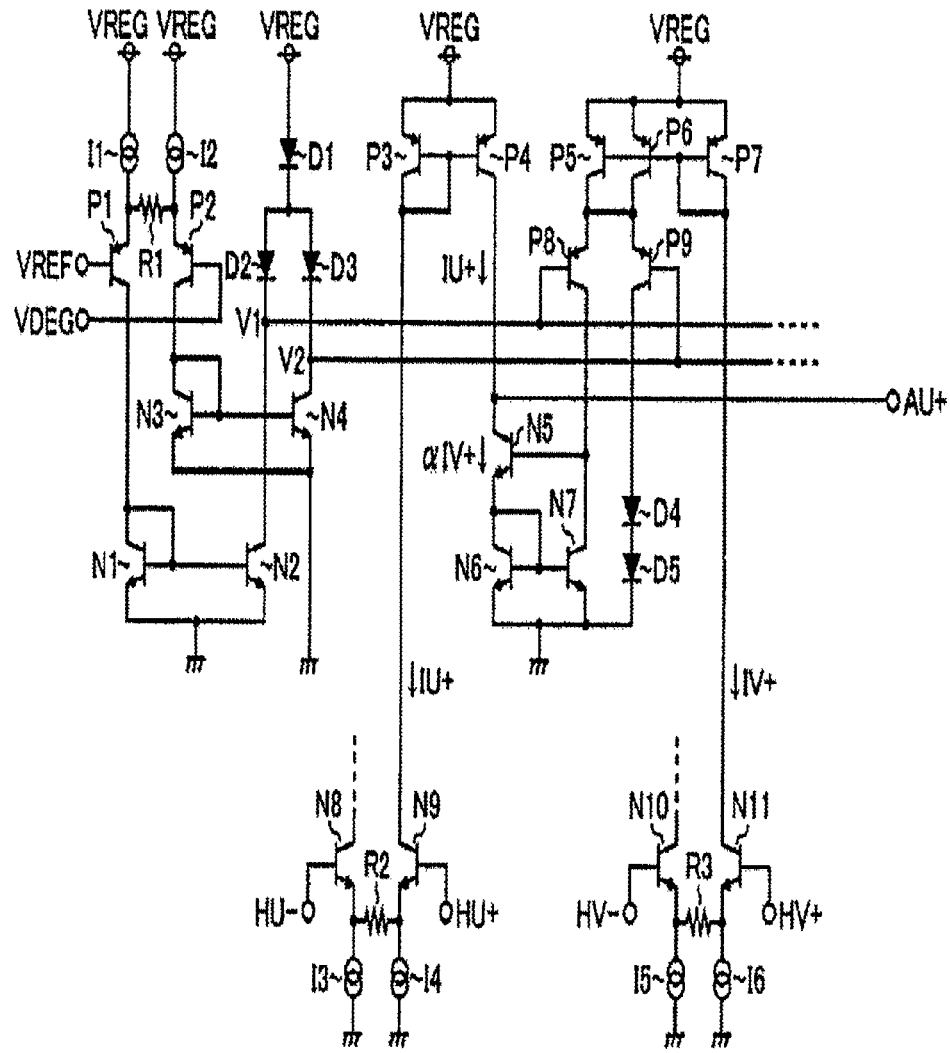
FIG. 14 is a circuit diagram of a structural example of a phase adjustment circuit 10.

FIG. 14 is a circuit diagram of a structural example of a phase adjustment circuit 10. In FIG. 14, for convenience of description, only a generation block of a step-angle hall current signal AU+ is depicted.

In the phase adjustment circuit 10 in this structural example, circuit elements forming the generation block of the step-angle hall current signal AU+ include pnp-type bipolar transistors P1 to P9, npn-type bipolar transistors N1 to N11, diodes D1 to D5, resistors R1 to R3, and current sources I1 to I6.

An emitter of the transistor P1 is connected to an applying end of an internal reference voltage VREG via the current source I1. An emitter of the transistor P2 is connected to the applying end of the internal reference voltage VREG via the current source I2. The resistor R1 is connected between the emitter of the transistor P1 and the emitter of the transistor P2. A collector of the transistor P1 is connected to a collector of the transistor N1. A collector of the transistor P2 is connected to a collector of the transistor N3. A base of the transistor P1 is connected to an applying end of a reference voltage VREF (for example, 2.5 V). A base of the transistor P2 is connected to an applying end of a step-angle control voltage VDEG.

Both emitters of the transistors N1 and N2 are connected to a ground end. Both bases of the transistors N1 and N2 are connected to a collector of the transistor N1. A collector of the transistor N2 is connected to an applying end of a voltage signal V1. Both emitters of the transistors N3 and N4 are connected to the ground end. Both bases of the transistors N3 and N4 are connected to a collector of the transistor N3. A collector of the transistor N4 is connected to an applying end of a voltage signal V2.

An anode of the diode D1 is connected to the applying end of the internal reference voltage VREG. A cathode of the diode D1 is connected to anodes of the diodes D2 and D3. A cathode of the diode D2 is connected to the applying end of the voltage signal V1. A cathode of the diode D3 is connected to the applying end of the voltage signal V2.

Both emitters of the transistors P3 and P4 are connected to the applying end of the internal reference voltage VREG. Both bases of the transistors P3 and P4 are connected to a collector of the transistor P3. A collector of the transistor P3 is connected to a collector of the transistor N9. A base of the transistor N9 is connected to an applying end of a hall voltage signal HU+. An emitter of the transistor N9 is connected to the ground end via the current source I4, and is also connected to an emitter of the transistor N8 via the resistor R2. The emitter of the transistor N8 is connected to the ground end via the current source I3. A base of the transistor N8 is connected to an applying end of a hall voltage signal HU−.

A collector of the transistor P4 is connected to a collector of the transistor N5 and is connected to an output end of a step-angle hall current signal AU+. An emitter of the transistor N5 is connected to a collector of the transistor N6. Both emitters of the transistors N6 and N7 are connected to the ground end. Both bases of the transistors N6 and N7 are connected to the collector of the transistor N6. A collector of the transistor N7 is connected to a base of the transistor N5 and connected to the collector of the transistor P8. An emitter of the transistor P8 is connected to a collector of the transistor P5.

All emitters of the transistors P5 to P7 are connected to the applying end of the internal reference voltage VREG. All bases of the transistors P5 to P7 are connected to a collector of the transistor P7. A collector of the transistor P6 is connected to emitters of the transistors P8 and P9, respectively. A collector of the transistor P9 is connected to an anode of the diode D4. A cathode of the diode D4 is connected to an anode of the diode D5. A cathode of the diode D5 is connected to the ground end. A base of the transistor P8 is connected to the applying end of the voltage signal V1. A base of the transistor P9 is connected to the applying end of the voltage signal V2.

A collector of the transistor P7 is connected to a collector of the transistor N11. A base of the transistor N11 is connected to an applying end of a hall voltage signal HV+. An emitter of the transistor N11 is connected to the ground end via the current source I6, and is also connected to an emitter of the transistor N10 via the resistor R3. The emitter of the transistor N10 is connected to the ground end via the current source I5. A base of the transistor N10 is connected to an applying end of a hall voltage signal HV−.

The action of the phase adjustment circuit 10 comprising the structure is described. If the hall voltage signal HU+ is higher than the hall voltage signal HU−, the hall current signal IU+ flowing through the transistor P3 increases; otherwise, if the hall voltage signal HU+ is lower than the hall voltage signal HU−, the hall current signal IU+ decreases. Through current mirrors (P3 and P4), the hall current signal IU+ becomes a source current flowing into an output end of the step-angle hall current signal AU+.

If the hall voltage signal HV+ is higher than the hall voltage signal HV−, the hall current signal IV+ flowing through the transistor P7 increases; otherwise, if the hall voltage signal HV+ is lower than the hall voltage signal HV−, the hall current signal IV+ decreases. Through current mirrors (P5 to P7) and (N5 to N7), the hall current signal IV+ becomes a sink current drawn from an output end of the step-angle hall current signal AU+.

The sink current changes according to the conductance of the transistors P8 and P9. When the voltage signal V1 and the voltage signal V2 have the same potential (in other words, the step-angle control voltage VDEG and the reference voltage VREF have the same level), the conductance of the transistors P8 and P9 is the same. Therefore, a mirror current (IV+) flowing through the transistor P5 and a mirror current (IV+) flowing through the transistor P6 are evenly allocated to the transistors P8 and P9. Through the current mirrors (N5 to N7), the hall current signal IV+ flowing through the transistor P7 directly becomes the sink current.

When the voltage signal V1 is lower than the voltage signal V2 (in other words, the step-angle control voltage VDEG is higher than the reference voltage VREF), the conductance of the transistor P8 is greater than that of the transistor P9. Therefore, compared with the transistor P9, the transistor P8 is allocated with a larger current. Consequently, the current flowing through the transistor P8 increases, and further, the sink current generated through the current mirrors (N5 to N7) becomes greater than the hall current signal IV+.

When the voltage signal V1 is higher than the voltage signal V2 (in other words, the step-angle control voltage VDEG is lower than the reference voltage VREF), the conductance of the transistor P9 is greater than that of the transistor P8. Therefore, compared with the transistor P8, the transistor P9 is allocated with a larger current. Consequently, the current flowing through the transistor P8 decreases, and further, the sink current generated through the current mirrors (N5 to N7) becomes smaller than the hall current signal IV+.

That is, the sink current drawn from the output end of the step-angle hall current signal AU+ becomes a current obtained through multiplying the hall current signal IV+ by a ratio α (AU+=α×(IV+)). Therefore, the step-angle hall current signal AU+ is indicated by the following formula (1). In addition, other step-angle hall current signals AU−, AV+/AV− and AW+/AW− generated by the circuit with the same structure as that in FIG. 14 can also be indicated by the following formulas (2) to (6). In this way, the phase adjustment circuit 10 has the following structure, that is, the hall current signal of the second phase is added with the hall current signal of the first phase with a specific ratio α to generate the step-angle hall current signal.

$$(AU+)=(IU+)-\alpha\times(IV+)=(IU+)+\alpha\times(IV-) \tag{1}$$

$$(AU-)=(IU-)-\alpha\times(IV-)=(IU-)+\alpha\times(IV+) \tag{2}$$

$$(AV+)=(IV+)-\alpha\times(IW+)=(IV+)+\alpha\times(IW-) \tag{3}$$

$$(AV-)=(IV-)-\alpha\times(IW-)=(IV-)+\alpha\times(IW+) \tag{4}$$

$$(AW+)=(IW+)-\alpha\times(IU+)=(IW+)+\alpha\times(IU-) \tag{5}$$

$$(AW-)=(IW-)-\alpha\times(IU-)=(IW-)+\alpha\times(IU+) \tag{6}$$

Figure 15:
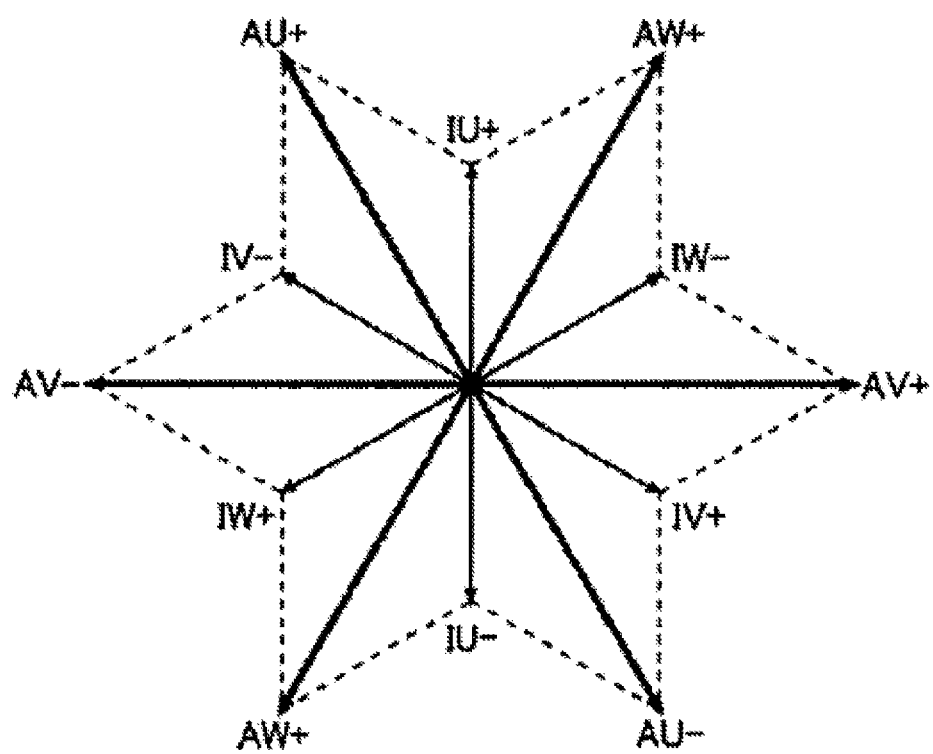
FIG. 15 is a vector diagram illustrating a phase offset operation.

FIG. 15 is a vector diagram illustrating a phase offset operation based on formulas (1) to (6). In addition, in FIG. 15, the phase is set to advance along a clockwise direction. For example, the phase of the hall current signal IU(+/−) lags behind the phase of the hall current signal IV(+/−) by 120°. Further, the phase of the hall current signal IV(+/−) lags behind the phase of the hall current signal IW(+/−) by 120°. Further, a phase difference between the hall current signal IU+ and the hall current signal IU−, a phase difference between the hall current signal IV+ and the hall current signal IV−, and a phase difference between the hall current signal IW+ and the hall current signal IW− are all 180° (phase inversion). Further, when α=1, the phase of the step-angle hall current signal A*(+/−) becomes a phase (reference phase) that lags behind the phase of the hall current signal I*(+/−) by 30°. Further, a phase offset θ (a phase difference with the reference phase when α=1) can be adjusted arbitrarily by variably controlling the ratio α, which is described with reference to FIG. 16.

Figure 16:
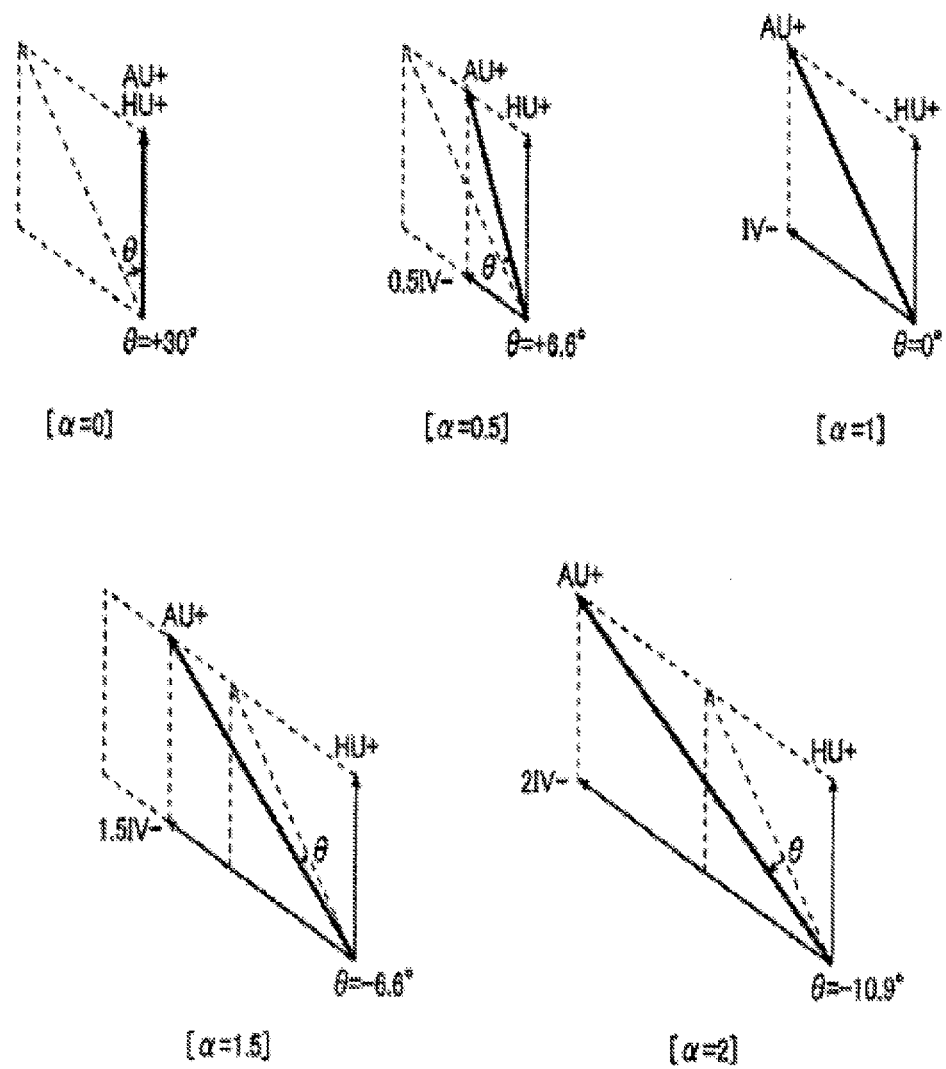
FIG. 16 is a vector diagram illustrating a relationship between a ratio α and a phase offset θ.

FIG. 16 is a vector diagram illustrating a relationship between a ratio α and a phase offset θ. As shown in FIG. 16, if it is defined that θ=0° when α=1, then θ=+30° when α=0, and θ=+6.6° when α=0.5. In another aspect, θ=−6.6° when α=1.5, and θ=−10.9° when α=2. Therefore, during step-angle control, in order to set the phase offset θ within the range of 0≤θ≤+30°, the ratio α is set within the range of 0≤α≤1.

The ratio α is decided according to a potential difference ΔV between the step-angle control voltage VDEG and the reference voltage VREF (ΔV=VREF−VDEG). More specifically, if ΔV=0 (that is, VREF=VDEG), α=1; if ΔV<0 (that is, VREF<VDEG), then 1<α≤2; if ΔV>0 (that is, VREF>VDEG), then 0≤α<1. For example, in the phase adjustment circuit 10 with the structure of FIG. 14, if it is set that VREF=VDEG=2.5 V, then α=1; if it is set that VREF=2.5V and correspondingly VDEG=0 V, then α=0.

Figure 17:
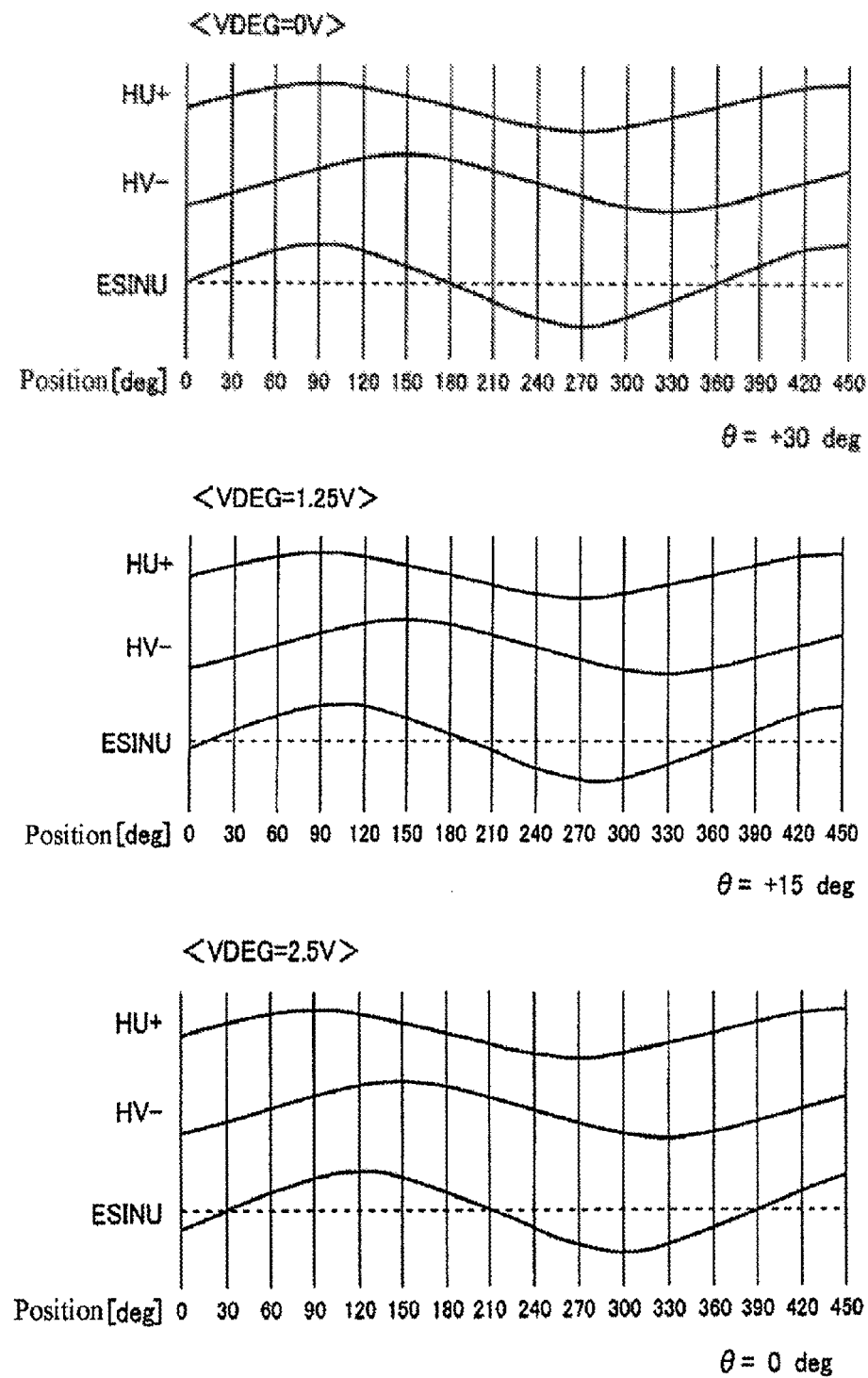
FIG. 17 is a time diagram of a relationship between a step-angle control voltage VDEG and a phase offset θ.

FIG. 17 is a time diagram of a relationship between a step-angle control voltage VDEG and a phase offset θ. In addition, FIG. 17 describes the hall voltage signals HU+ and HV− and a sine wave voltage signal E SIN U under the circumstance that the step-angle control voltage is changed to 0 V, 1.25V and 2.5V on the basis that the reference voltage VREF is set to 2.5 V. In addition, the step-angle control voltage VDEG can be adjusted in a linear manner through an external resistor.

Figure 18:
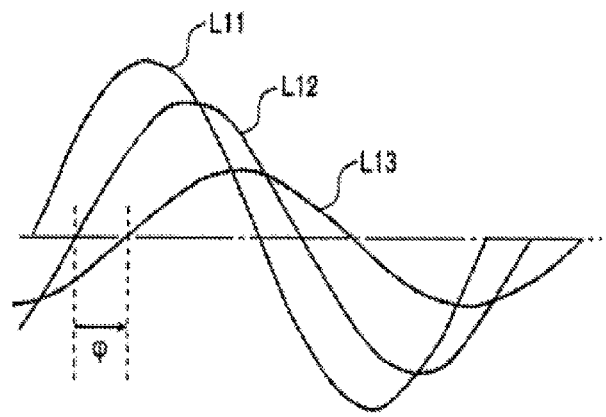
FIG. 18 is a time diagram of a phase difference φ between a driving current and an induced voltage of a motor.

FIG. 18 is a time diagram of a phase difference φ between a motor driving current and an induced voltage. The symbol L11 indicates a waveform of a motor driving voltage. The symbol L12 indicates a waveform of a motor induced voltage. The symbol L13 indicates a waveform of a motor driving current. The phase adjustment circuit 10 is used to perform phase adjustment (step-angle control) on the hall voltage signal H*(+/−), thereby reducing the phase difference φ (a phase delay caused by the load) between the motor driving current L13 and the motor induced voltage L12, and further maximizing the torque of the motor.

Figure 19:
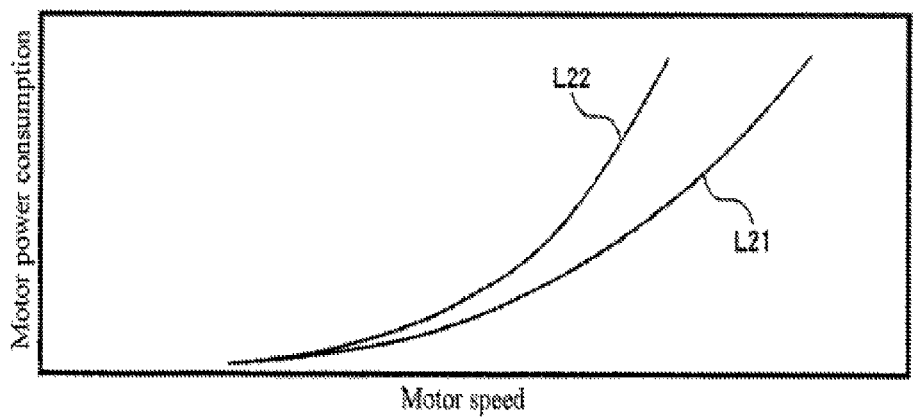
FIG. 19 is a correlation diagram between a rotational speed and power consumption of a motor.

FIG. 19 is a correlation diagram between a motor speed and power consumption. The symbol L21 indicates a behavior under the circumstance that step-angle control is performed. The symbol L22 indicates a behavior under the circumstance that step-angle control is not performed. According to FIG. 19, the phase adjustment circuit 10 performs phase adjustment (step-angle control) on the hall voltage signal H*(+/−), which especially improves power efficiency of the motor driving apparatus 1 when the motor rotates at a high speed.

In addition, when the phase adjustment (step-angle control) is performed on the hall voltage signal H*(+/−) through the vector operation, the amplitude of the step-angle hall current signal A*(+/−) changes according to the phase offset θ. The compensation is performed in the automatic gain control circuit 20 described in the following paragraphs.

<Automatic Gain Control Circuit>

Figure 20:
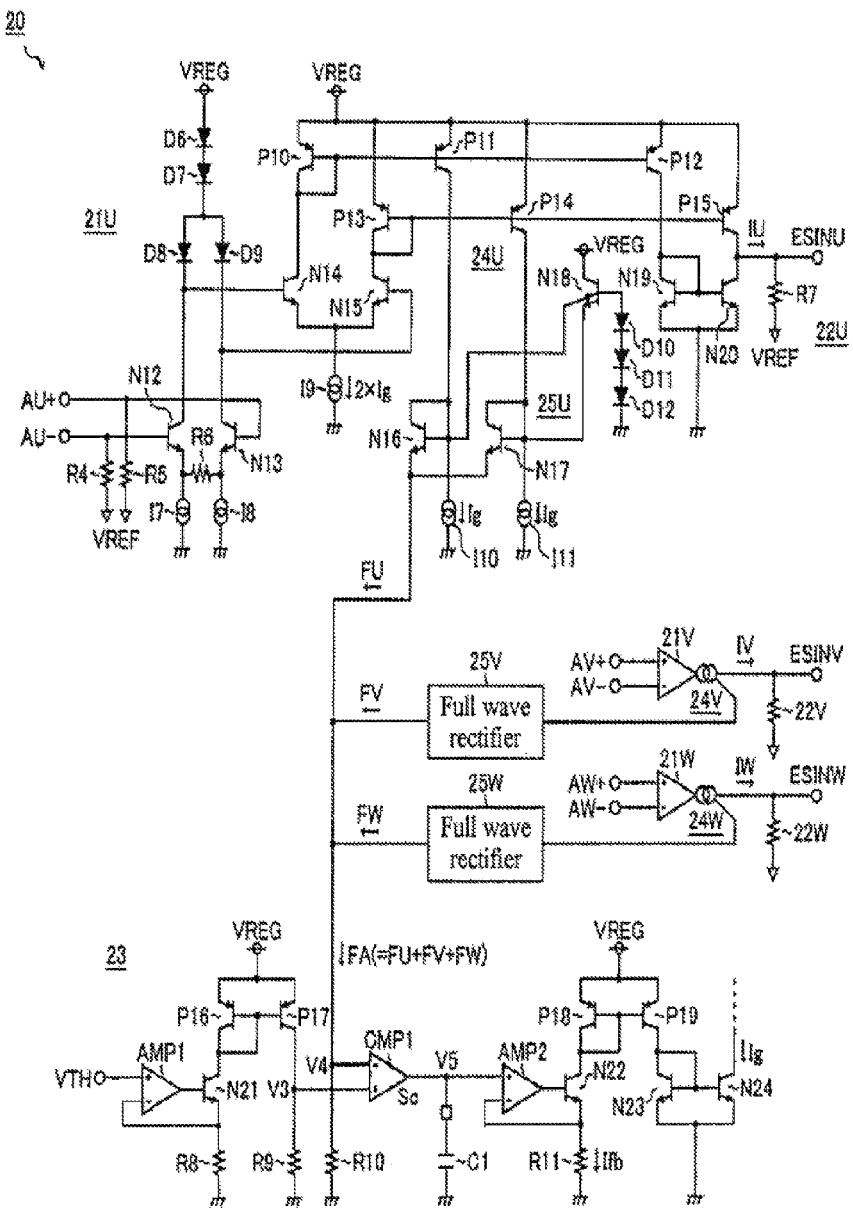
FIG. 20 is a circuit diagram of a structural example of an automatic gain control circuit 20.
Figure 21:
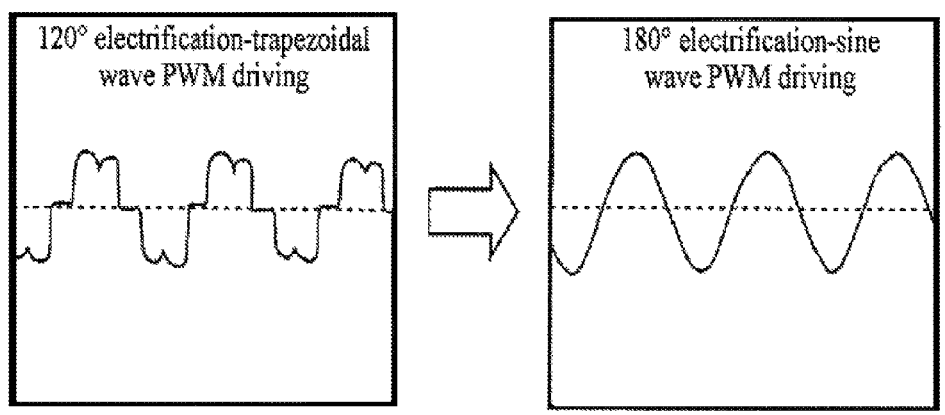
FIG. 21 is a time diagram of an example of a motor driving current waveform.

FIG. 20 is a circuit diagram of a structural example of an automatic gain control circuit 20. In addition, in FIG. 20, for the convenience of description, a generation block of a sine wave voltage signal E SIN U is specifically depicted.

The automatic gain control circuit 20 in this structural example includes pnp-type bipolar transistors P10 to P19, npn-type bipolar transistors N12 to N24, diodes D6 to D12, resistors R4 to R11, current sources I7 to I11, a capacitor C1, operational amplifiers AMP1 and AMP2, and a comparator CMP1.

An anode of a diode D1 is connected to an applying end of an internal reference voltage VREG. A cathode of the diode D1 is connected to an anode of the diode D7. A cathode of the diode D7 is respectively connected to anodes of the diodes D8 and D9. A cathode of the diode D8 is connected to a collector of the transistor N12 and a base of the transistor N14, respectively. A cathode of the diode D9 is connected to a collector of the transistor N13 and a base of the transistor N15, respectively. An emitter of the transistor N12 is connected to a ground end via the current source I7. An emitter of the transistor N13 is connected to the ground end via the current source I8. The resistor R6 is connected between the emitter of the transistor N13 and an emitter of the transistor N14. A base of the transistor N12 is connected to an input end of a step-angle hall current signal AU−, and is further connected to an applying end of a reference voltage VREF via the resistor R4. A base of the transistor N13 is connected to an input end of a step-angle hall current signal AU+, and is further connected to the applying end of the reference voltage VREF via the resistor R5.

Emitters of the transistors N14 and N15 are connected to each other, and a connecting node thereof is connected to the ground end via the current source I9. A collector of the transistor N14 is connected to a collector of the transistor P10. A collector of the transistor N15 is connected to a collector of the transistor P13. All emitters of the transistors P10 to P15 are connected to the applying end of the internal reference voltage VREG. All bases of the transistors P10 to P12 are connected to a collector of the transistor P10. All bases of the transistors P13 to P15 are connected to a collector of the transistor P13.

A collector of the transistor P12 is connected to a collector of the transistor N19. A collector of the transistor P15 is connected to a collector of the transistor N20. Both bases of the transistors N19 and N20 are connected to the collector of the transistor N19. Both emitters of the transistors N19 and N20 are connected to the ground end. A connecting node between the transistor P15 and the transistor N20 is connected to an output end of the sine wave voltage signal E SIN U, and is further connected to the applying end of the reference voltage VREF via the resistor R7.

A collector of the transistor P11 is connected to a base and a collector of the transistor N16, and is further connected to the ground end via the current source I10. A collector of the transistor P14 is connected to a base and a collector of the transistor N17, and is further connected to the ground end via the current source I11. The base of the transistor N16 is connected to a first emitter of the transistor N18. The base of the transistor N16 is connected to a second emitter of the transistor N18. A collector of the transistor N18 is connected to the applying end of the internal reference voltage VREG. A base of the transistor N18 is connected to an anode of the diode D10. A cathode of the diode D10 is connected to an anode of the diode D11. A cathode of the diode D11 is connected to an anode of the diode D12. A cathode of the diode D12 is connected to the ground end.

The emitters of the transistors N16 and N17 are connected to each other, and a connecting node thereof is connected to an inverting input end (−) of the comparator CMP1, and is also connected to the ground end via the resistor R10. A non-inverting input end (+) of the comparator CMP1 is connected to a collector of the transistor P17, and is also connected to the ground end via the resistor R9. Both emitters of the transistors P16 and P17 are connected to the applying end of the internal reference voltage VREG. Both bases of the transistors P16 and P17 are connected to a collector of the transistor P16. The collector of the transistor P16 is connected to a collector of the transistor N21. An emitter of the transistor N21 is connected to a ground end via the resistor R8. A base of the transistor N21 is connected to an output end of the operational amplifier AMP1. A non-inverting input end (+) of the operational amplifier AMP1 is connected to an applying end of a torque input voltage VTH. An inverting input end (−) of the operational amplifier AMP1 is connected to the emitter of the transistor N21.

An output end of the comparator CMP1 is connected to a non-inverting input end (+) of the operation comparator AMP2, and is also connected to the ground end via the capacitor C1. An inverting input end (−) of the operational amplifier AMP2 is connected to an emitter of the transistor N22. An output end of the operational amplifier AMP2 is connected to a base of the transistor N22. The emitter of the transistor N22 is connected to the ground end via the resistor R11. A collector of the transistor N22 is connected to a collector of the transistor P18. Both emitters of the transistors P18 and P19 are connected to the applying end of the internal reference voltage VREG. Both bases of the transistors P18 and P19 are connected to the collector of the transistor P18. A collector of the transistor P19 is connected to a collector of the transistor N23. Both emitters of the transistor N23 and N24 are connected to the ground end. Both bases of the transistors N23 and N24 are connected to a collector of the transistor N23. A collector of the transistor N24 is equivalent to an output end of a gain setting current Ig.

Further, the current source I9 generates an amplifier driving current that doubles the gain setting current Ig (2×Ig). Further, the current sources I10 and I11 generate an amplifier driving current (Ig) that is equal to the gain setting current Ig, respectively.

In the automatic control circuit 20 comprising the structure, circuit blocks depicted at the upper left and upper right in FIG. 20 (namely, D6 to D9, P10, P12, P13, P15, N12 to N15, N19, N20, R4, R5, and 17 to 19) are equivalent to a difference amplifier 21U, and the difference amplifier 21U performs differential amplification on the step-angle hall current AU+/AU−, to generate an amplified hall current signal IU. In addition, difference amplifiers 21V and 21W of a V phase and a W phase can also be implemented with the same structure.

The resistor R7 depicted at the upper right of FIG. 20 is equivalent to a current/voltage conversion portion 22U, and the current/voltage conversion portion 22U enables the sine wave voltage signal E SIN U to be generated from the amplified hall current signal IU. In addition, the current/voltage conversion portions 22V and 22W of a V phase and a W phase can also be implemented with the same structure.

The circuit block drawn in the upper central part of FIG. 20 (namely, P11, P14, N16 to N17, D10 to D12, I10, and I11) is equivalent to a monitoring current signal generation portion 24U and a full wave rectifier 25U. The monitoring current signal generation portion 24U is a current mirror section (P10 to P11, and P13 to P14) for generating a monitoring current signal IUm equivalent to the amplified hall current signal IU. The full wave rectifier 25U performs full wave rectification on the monitoring current signal IUm to generate a rectified monitoring current signal FU. In addition, the transistors N16 and N17 connected by a diode can also be replaced by a diode. Further, if the priority is to reduce circuit size, the full wave rectifier 25U can be replaced by a half wave rectifier (the structure excluding P11, N16 and I10). In addition, the monitoring current signal generation portions 24V and 24W, and the full wave rectifiers 25V and 25W of a V phase and a W phase can also be implemented with the same structure.

The circuit block depicted in the lower section of FIG. 20 (P16 to P19, N21 to N24, R8 to R11, AMP1, AMP2 and CMP1) is equivalent to a feedback control portion 23. The feedback control portion 23 monitors an accumulated rectified monitoring current signal FA which is obtained by adding rectified monitoring current signals FU, FV and FW of the three phases, to decide a gain (more specifically, the gain setting current Ig) of the difference amplifier 21.

The action of the feedback control portion 23 with the above constitution is described. The comparator CMP1 compares a reference voltage V3 (V3=(R9/R8)×VTH) corresponding to the torque input voltage VTH and a monitoring voltage V4 (V4=FA×R10) corresponding to the accumulated rectified monitoring current signal FA, and outputs a binary comparison result signal Sc corresponding to the comparison result. The comparison result signal Sc becomes a low level if the monitoring voltage V4 is higher than the reference voltage V3, and becomes a high level if the monitoring voltage V4 is lower than the reference voltage V3.

A capacitor C1 is applied to the non-inverting input end (+) of the operational amplifier AMP2 to smooth the comparison result signal Sc, to obtain a smooth voltage V5. Therefore, the smooth voltage V5 becomes higher if a high level period of the comparison result signal Sc is longer, and becomes lower if the high level period of the comparison result signal Sc is shorter.

The operator amplifier AMP2 controls a base voltage of the transistor N22, so that an emitter voltage of the transistor N22 is the same as the smooth voltage V5. Therefore, a feedback current Ifb based on the voltage value of the smooth voltage V5 and the resistance value of the resistor R11 (Ifb=V5/R11) flows through the resistor R11. The gain setting current Ig is generated in response to the feedback current Ifb.

The gain setting current Ig generated in such a manner becomes greater when the smooth voltage V5 is higher, and becomes smaller when the smooth voltage V5 is lower. In other words, the gain setting current Ig becomes greater if the high level period of the comparison result signal Sc (a period when the reference signal V3 is higher than the monitoring voltage V4) is longer, and becomes smaller if the high level period of the comparison result signal Sc is shorter.

Therefore, in the feedback control portion 23, the gain of the difference amplifier 21 is controlled automatically, so that the monitoring voltage V4 is the same as the reference voltage V3. Such a structure, different from the structure in the prior art in which the automatic gain control is performed according to a motor driving current IRNF flowing at a power driving section, does not cause the power efficiency or immunity to decline, and can further perform automatic gain control on the sine wave voltage signals E SIN U, E SIN V and E SIN W.

In addition, as long as a signal path for transmitting a rotor-position detecting signal (H*(+/−)→I*(+/−)→A*(+/−)→I*→E SIN*→P*) has the structure of the automatic gain control circuit 20, even if the amplitude of the step-angle hall current signal A*(+/−) changes according to the phase offset θ, the amplitude of the sine wave voltage signal E SIN* is enabled to be the same as an expected value corresponding to the torque input voltage VTH. Therefore, both step-angle control and torque control can be implemented.

Hall components are components with temperature characteristics, and the amplitude of the hall voltage signal changes along with the ambient temperature of the motor. Therefore, in a vehicle motor driving apparatus with significant changes of ambient temperature, the following structure is usually adopted in the prior art: a hall voltage signal of a trapezoidal waveform is received from a hall component which acts in a saturated region in a manner in which the temperature characteristics are invisible, and detection is only performed on a zero cross point thereof. An output duty ratio of the motor driving signal is decided according to an analog digital sine wave signal generated inside the IC.

However, in the structure of the prior art, the waveform of the motor driving current has a lot of distortion, causing the problem of noise or chattering when the motor is driven. Especially, in a hybrid vehicle (HV, a hybrid circuit) or hybrid electric vehicle (HEV, a hybrid equivalent circuit) in which the driving environment is particularly quiet, the noise from various motors (such as those for an air conditioner compressor, a battery cooling fan, and a blade cooling fan) can become unacceptably annoying to a driver or passenger.

In comparison, in the motor driving apparatus 1 having the automatic gain control circuit 20, even if the amplitude of the hall voltage signal H*(+/−) changes due to the temperature characteristics of the hall component, the amplitude of the sine wave voltage signal E SIN* still can be the same as the expected value corresponding to the torque input voltage VTH. Therefore, the sine wave hall voltage signal H*(+/−) can be received from the hall component which acts in an unsaturated region, and the output duty ration of a motor driving signal D*(H/L) is decided according to the sine wave signal, thereby restraining distortion of the waveform of the motor driving current, and reducing noise or chattering when the motor is driven.

Figure 23:
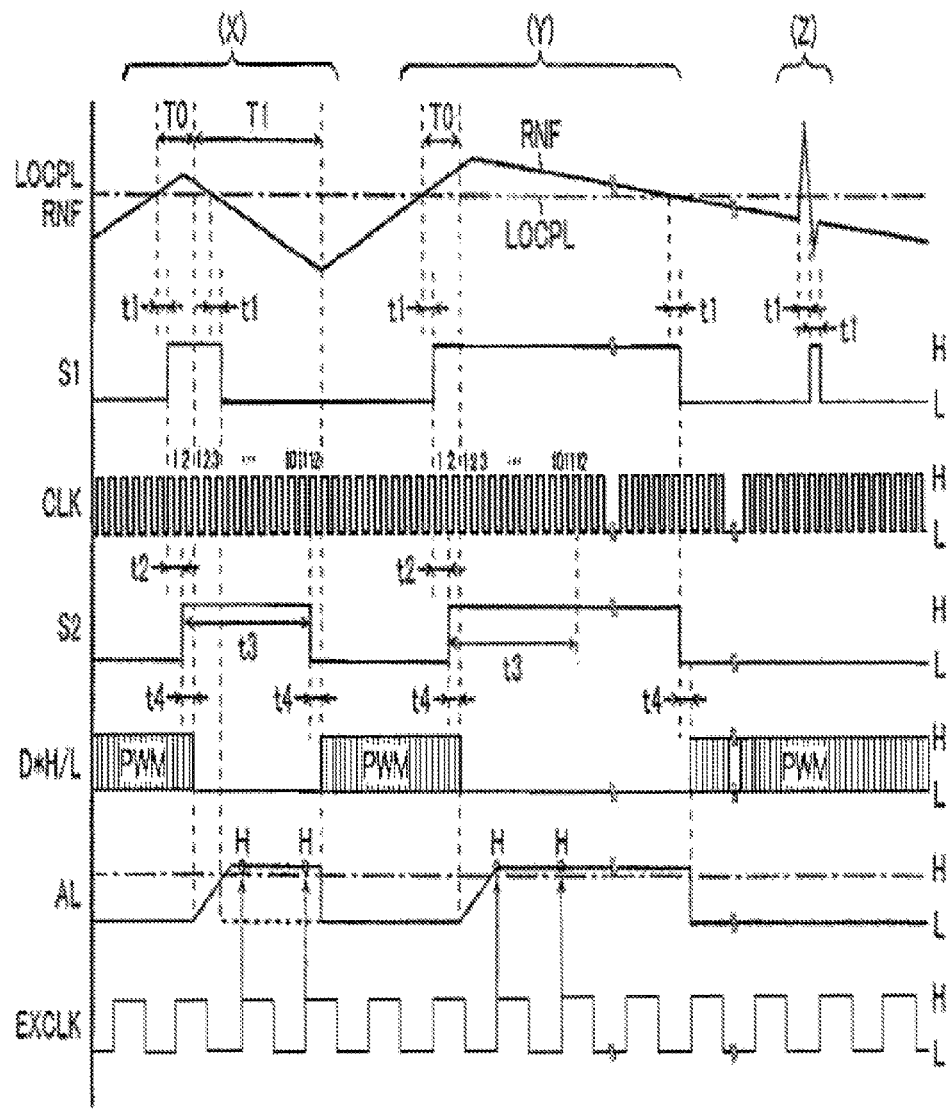
FIG. 23 is a time diagram of an example of an OCP action.

FIG. 23 is a time diagram of an example of a motor driving current waveform. The waveform of the motor driving current during the driving of 120° electrification-trapezoidal wave PWM is depicted at the left side of FIG. 23, and the waveform of the motor driving current during the driving of 180° electrification-sine wave PWM is depicted at the left side of FIG. 23. In this way, more effective muting is achieved through the sine wave PWM driving control and 180° electrification control.

<OCP Circuit>

Figure 22:
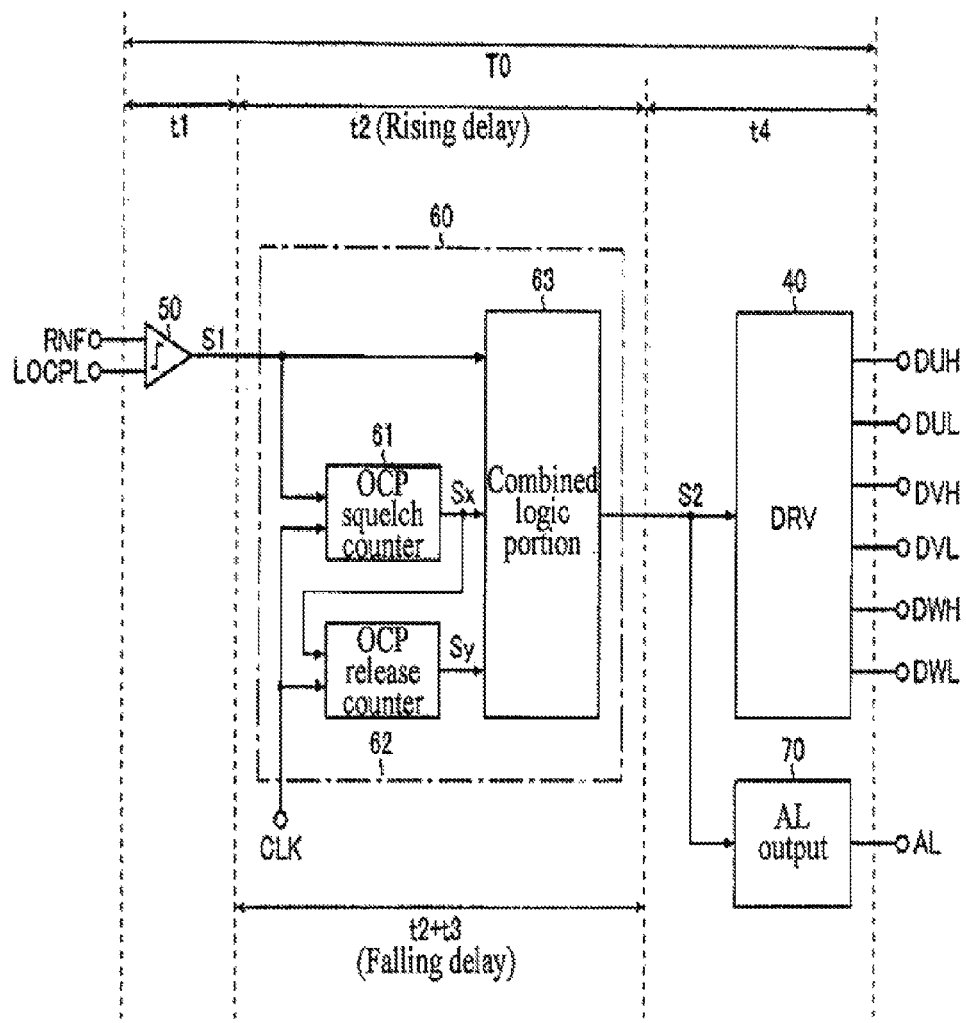
FIG. 22 is a block diagram of a structural example of an over current protection (OCP) circuit 60.

FIG. 22 is a block diagram of a structural example of an OCP circuit 60. The OCP circuit 60 in this structural example includes an OCP mute counter 61, an OCP release counter 62 and a combined logic portion 63.

The OCP mute counter 61 is a first counter that counts during the following OCP mute period t2. The OCP mute counter 61 starts counting pulses of an internal clock signal CLK when an over voltage detecting signal S1 is at a fault logic level (for example, a high level). The OCP mute counter 61 outputs a first counter signal Sx indicating whether a counting value reaches a specific threshold CTx. For example, under the circumstance that a period of the internal clock signal CLK is set to 3 μs and the threshold CTx is set to 2, the OCP mute period t2 is 6 μs (6 μs=3 μs×2). In addition, the OCP mute counter 61 resets the counting value when the over voltage detecting signal S1 is at a normal logic level (for example, a low level).

The OCP release counter 62 is a second counter that counts during the following OCP release period t3. The OCP release counter 62 starts counting pulses of the internal clock signal CLK when the first counter signal Sx is at a logic level (for example, a high level) when the counting is finished. The OCP release counter 62 outputs a second counter signal Sy indicating whether a counting value reaches a specific threshold CTy. For example, under the circumstance that a period of the internal clock signal CLK is set to 3 μs and the threshold CTy is set to 12, the OCP mute period t3 is 36 μs (36 μs=3 μs×12).

The combined logic portion 63 receives input of the over current detecting signal S1, the first counter signal Sx, and the second counter signal Sy, and performs combined logic operation on the signals, to generate an OCP signal S2. When the OCP signal S2 is at a fault logic level (for example, a high level), a pre-driving circuit 40 forcibly enables the motor driving signal D*(H/L) to be at a low level. In addition, in an alarm signal generation circuit 70, a transistor 71 is switched on, generating an alarm signal AL at a high level. In addition, the generation action of the OCP signal S2 is described in detail with reference to FIG. 23.

FIG. 23 is a time diagram of an example of an OCP action, and an LOCPL terminal voltage, an RNF terminal voltage, an over current detecting signal S1, an internal clock signal CLK, an OCP signal S2, a motor driving signal D*(H/L), an alarm signal AL and an external clock signal EXCLK are depicted from top to bottom in sequence. Symbols t1, t2, t3, and t4 indicate a signal voltage delay time of an over current detection circuit 50, an OCP mute period, an OCP release period, and a signal transmission delay period of a pre-driving circuit 40, respectively. T0 indicates an OCP mute delay time (OCP mute delay time=t1+t2+t3), and T1 indicates an OCP release delay time (OCP release delay time=t3).

Description is first given with reference to a scenario (X) in which the motor driving current drops instantaneously to an over current state and immediately returns to a normal state.

At a moment defined by a delay time t1 after the RNF terminal voltage exceeds the LOCPL terminal voltage, the over current detecting signal S1 is lifted to the high level. At a moment defined by an OCP mute period t2 after the over current detecting signal is lifted to the high level, the OCP signal S2 is lifted to the high level. At a moment defined by a delay time t4 after the OCP signal S2 is lifted to the high level, the motor driving signal D*(H/L) is forcibly enabled to become the low level. Further, at a moment defined by the delay time t4 after the OCP signal S2 is lifted to the high level, the alarm signal AL starts to rise.

In another aspect, at a moment defined by a delay time t1 after the RNF terminal voltage falls below the LOCPL terminal voltage, the over current detecting signal S1 declines to the low level. At this time, the counting in the OCP release period t3 is not finished. Therefore, the OCP signal S2 is maintained at the high level. Through the above action, the rising time of the alarm signal AL will be assured. Therefore, the alarm signal AL is factually lifted to the high level. In addition, as for the OCP release period t3, an Electronic Control Unit (ECU) synchronous with the external clock signal EXCLK can be adopted to factually detect the length of the alarm signal AL (for example, two periods of the external clock signal EXCLK).

Subsequently, at a moment when the counting of the OCP release period t3 is finished, the OCP signal S2 declines to the low level. At a moment defined by a delay time t4 after the OCP signal S2 declines to the low level, the PWM driving of the motor driving signal D*(H/L) is restarted. Further, at a moment defined by a delay time t4 after the OCP signal S2 declines to the low level, the alarm signal AL declines to the low level.

The following paragraphs describe events with reference to a scenario (Y) in which the motor driving current is maintained at the over current state for a long time and then restored to a normal state.

The events from the moment when the RNF terminal voltage exceeds the LOCPL terminal voltage to the moment when the OCP current S2 is lifted to the high level are the same as those in scenario (X). In another aspect, in scenario (Y), at a moment when the counting in the OCP release period t3 is finished, the RNF terminal voltage is not lower than the LOCPL terminal voltage, while the over current detecting signal S1 is maintained at the high level. Therefore, instead of declining to the low level, the OCP protection signal S2 is maintained at the high level. As a result, the motor driving signal D*(H/L) is maintained at the low level, and the alarm signal AL is maintained at the high level.

Subsequently, at a moment defined by the delay time t1 after the RNF terminal voltage falls below the LOCPL terminal voltage, the over current detecting signal S1 declines to the low level, and almost simultaneously, the OCP signal S2 also declines to the low level. Actions after the OCP signal S2 declines to the low level are the same as those in the scenario (X).

Actions in a situation where noise is superposed on the RNF terminal voltage are described with reference to a scenario (Z). As in scenario (X) or (Y), at a moment defined by a delay time t1 after the RNF terminal voltage exceeds the LOCPL terminal voltage, the over current detecting signal S1 is lifted to the high level, and the counting of the OCP mute period t2 is started. However, the rise of the RNF terminal voltage caused by the noise element is finished in a very short time. Therefore, in scenario (Z), before the counting of the OCP mute period t2 is finished, the RNF terminal voltage becomes lower than the LOCPL terminal voltage, and the over current detecting signal S1 declines to the low level. Consequently, the OCP signal S2 is not lifted to the high level while the noise superposed on the RNF terminal voltage is shielded (eliminated).

As described above, the OCP circuit 60 in this structural example has the following structure: when the over current state of the motor driving current lasts for an OCP mute period t2, the pre-driving circuit 40 is forced to suspend at least during the OCP release period t3. Through such a structure, malfunction caused by noise can be properly prevented.

OTHER VARIANT EXAMPLES

As another representative example, the present invention is applied to the structure of a three-phase motor driver IC. However, application of the present invention is not limited thereto. The present invention can be widely applied to all motor driving apparatuses.

To this end, the structure in which the hall component is used as the rotor-position detecting component is taken as an example. However, the structure of the present invention is not limited thereto. Other manners of the rotor-position detecting component can also be used.

Therefore, in addition to the above embodiments, various changes can be added to the structure of the present invention without departing from the scope of the subject of the present invention. That is, the embodiment should be construed as an example in all aspects rather than a limitation to the present invention. Moreover, it should be understood that the technical scope of the present invention is defined by the scope of the claims rather than the description of the embodiment, and includes all changes having the equivalent meaning with and within the scope of the claims.

INDUSTRIAL USABILITY

The present invention can be applied to all technologies related to motor driving apparatus. For example, the present invention can be applied to a vehicle three-phase motor driver IC.

What is claimed is:

1. A motor driving apparatus, comprising an automatic gain control circuit on a signal path for transmitting a rotor-position detecting signal, wherein the automatic gain control circuit comprises:
   a difference amplifier, for differential amplifying a differential input signal to generate an amplified hall current signal;
   a current mirror section, for generating a monitoring current signal equivalent to the amplified hall current signal;
   a full wave rectifier, for full wave rectifying the monitoring current signal to generate a rectified monitoring current signal;
   a feedback control portion, for monitoring an accumulated rectified monitoring current signal to decide a gain of the difference amplifier, the accumulated rectified monitoring current signal is obtained by adding the rectified monitoring current signal of three phases comprising a first phase, a second phase, and a third phase; and
   a current/voltage conversion portion, for generating a sine wave voltage signal from the amplified hall current signal,
   wherein the automatic gain control circuit outputs the sine wave voltage signal as an output signal.

2. The motor driving apparatus according to claim 1, wherein the feedback control portion decides the gain of the difference amplifier, so as to enable the accumulated rectified monitoring current signal to become a specific signal level.

3. The motor driving apparatus according to claim 1, further comprising a phase adjustment circuit for performing phase adjustment on the rotor-position detecting signal.

4. The motor driving apparatus according to claim 3, wherein the phase adjustment circuit performs the phase adjustment on the rotor-position detecting signal of the first phase by adding the rotor-position detecting signal of the second phase and the rotor-position detecting signal of the first phase at a specific ratio.

5. The motor driving apparatus according to claim 4, wherein the ratio is variably controlled according to a control voltage.

6. The motor driving apparatus according to claim 1, further comprising: a pulse width modulation (PWM) signal generation circuit, for comparing the output signal of the automatic gain control circuit and a triangle wave signal at a specific frequency, to generate a PWM signal; and a driving circuit, for generating a motor driving signal according to the PWM signal.

7. The motor driving apparatus according to claim 6, further comprising: an over current detection circuit, for detecting whether a motor driving current is in an over current state; and an over current protection circuit, for forcing the driving circuit to stop when the over current is detected.

8. The motor driving apparatus according to claim 7, wherein the over current protection circuit forces the driving circuit to suspend at least for a specific release period when the over current state of the motor driving current lasts a specific mute period.

9. The motor driving apparatus according to claim 8, wherein the over current protection circuit comprises: a first counter, for counting the mute period; and a second counter, for counting the release period.

10. A motor apparatus, comprising:
    a motor;
    a rotor-position detecting component, for generating a rotor-position detecting signal; and
    the motor driving apparatus according to claim 1, for receiving input of the rotor-position detecting signal to perform driving control on the motor.

11. The motor driving apparatus according to claim 10, wherein the rotor-position detecting component is a hall component.

* * * * *